(12) United States Patent
Nahass et al.

(10) Patent No.: US 11,763,343 B2
(45) Date of Patent: Sep. 19, 2023

(54) SYSTEMS AND METHODS FOR VALIDATING INTERACTION WITH THIRD-PARTY INTERACTIVE MEDIA

(71) Applicant: Google LLC, Mountain View, CA (US)

(72) Inventors: Pasha Nahass, San Francisco, CA (US); Arunkumar Balaraman, Cupertino, CA (US); Tuna Toksoz, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 624 days.

(21) Appl. No.: 15/344,246

(22) Filed: Nov. 4, 2016

(65) Prior Publication Data

US 2018/0130092 A1    May 10, 2018

(51) Int. Cl.
*G06Q 30/02*    (2023.01)
*G06Q 30/0241*  (2023.01)
(Continued)

(52) U.S. Cl.
CPC ....... *G06Q 30/0248* (2013.01); *A63F 13/352* (2014.09); *A63F 13/49* (2014.09);
(Continued)

(58) Field of Classification Search
CPC .... G06Q 30/00–30/0284; A63F 13/352; A63F 13/49; A63F 13/69; A63F 13/79;
(Continued)

(56) References Cited

U.S. PATENT DOCUMENTS 5,838,314 A    11/1998  Neel et al.
8,065,702 B2   11/2011  Goldberg et al.
(Continued)

FOREIGN PATENT DOCUMENTS

CN    103180870 A    6/2013
EP    2 745 893 A2   6/2014
(Continued)

OTHER PUBLICATIONS

The Need for Inter-Destination Synchronization for Emerging Social Interactive Multimedia Applications, p. 150, IEEE communications magazine, Nov. 2012 (Year: 2012).*
(Continued)

*Primary Examiner* — John Van Bramer
*Assistant Examiner* — Darnell A Pouncil
(74) *Attorney, Agent, or Firm* — Dority & Manning, P.A.

(57) ABSTRACT

A client system presents, within an execution environment of an application, a third-party media stream distinct from the application, received from a remote host server via a network. The client system detects interaction events during presentation of the third-party media stream, and transmits descriptions of the detected interaction events to the remote host server. The client system updates a data set with data corresponding to detected interaction events and generates, by application of an interaction heuristic to the data set, an interaction score indicative of a likelihood of engagement with the third-party media stream. The interaction score is provided to the application, which may then provide a reward based on the likelihood of engagement. In some implementations, the interaction heuristic is based on a number or frequency of interaction events, e.g., button utilization, screen taps, device motion, or screen changes detected during presentation of the received third-party media stream.

23 Claims, 7 Drawing Sheets

(51) Int. Cl.
  *A63F 13/352* (2014.01)
  *A63F 13/49* (2014.01)
  *A63F 13/69* (2014.01)
  *A63F 13/79* (2014.01)
  *H04L 67/53* (2022.01)
  *H04L 67/50* (2022.01)
  *H04L 65/1063* (2022.01)
  *H04L 65/61* (2022.01)
  *H04L 67/01* (2022.01)

(52) U.S. Cl.
  CPC .............. *A63F 13/69* (2014.09); *A63F 13/79* (2014.09); *H04L 65/1063* (2013.01); *H04L 67/53* (2022.05); *H04L 67/535* (2022.05); *H04L 65/61* (2022.05); *H04L 67/01* (2022.05)

(58) Field of Classification Search
  CPC ..... H04L 65/1063; H04L 67/20; H04L 67/22; H04L 65/4069; H04L 67/42; H04L 67/53; H04L 67/535; H04L 65/61; H04L 67/01
  See application file for complete search history.

(56) References Cited

U.S. PATENT DOCUMENTS

| | | | |
|---|---|---|---|
| 8,166,500 B2* | 4/2012 | Sakhartov | H04N 21/23424 725/32 |
| 8,660,891 B2 | 2/2014 | Ramer et al. | |
| 9,191,450 B2 | 11/2015 | Sidi et al. | |
| 9,224,100 B1 | 12/2015 | Chatterjee et al. | |
| 9,390,438 B2 | 7/2016 | Baird et al. | |
| 9,396,608 B2 | 7/2016 | Burgin et al. | |
| 9,473,804 B1* | 10/2016 | Glasgow | H04N 21/23424 |
| 10,410,241 B1* | 9/2019 | Burcham | G06Q 30/0267 |
| 2006/0123340 A1* | 6/2006 | Bailey | G06F 16/958 715/700 |
| 2006/0280177 A1* | 12/2006 | Gupta | H04L 29/06027 370/389 |
| 2007/0129990 A1* | 6/2007 | Tzruya | G06F 9/455 705/14.19 |
| 2008/0137848 A1* | 6/2008 | Kocher | H04L 9/302 380/201 |
| 2009/0055254 A1 | 2/2009 | Madhavan et al. | |
| 2009/0083631 A1* | 3/2009 | Sidi | H04L 67/535 715/721 |
| 2009/0158317 A1 | 6/2009 | Sakhartov et al. | |
| 2010/0306270 A1* | 12/2010 | McDiarmid | G06F 8/61 718/1 |
| 2013/0275879 A1 | 10/2013 | Dharmaji et al. | |
| 2014/0068549 A1* | 3/2014 | Friedman | G06F 8/30 717/104 |
| 2014/0248943 A1* | 9/2014 | Burgin | A63F 13/12 463/29 |
| 2014/0273822 A1* | 9/2014 | Gutierrez | H04W 8/005 455/41.1 |
| 2015/0193814 A1* | 7/2015 | Eppinger | G06Q 30/0242 705/14.41 |
| 2015/0262199 A1* | 9/2015 | Taylor | H04L 67/22 705/7.29 |
| 2016/0158650 A1 | 6/2016 | Chan | |
| 2016/0165318 A1 | 6/2016 | Chandler et al. | |
| 2016/0202861 A1 | 7/2016 | Weskamp | |
| 2016/0210660 A1 | 7/2016 | Flynn | |
| 2016/0220901 A1 | 8/2016 | Perlman et al. | |

FOREIGN PATENT DOCUMENTS

| | | |
|---|---|---|
| EP | 2745893 A2 * | 6/2014 |
| GB | 2534613 | 8/2016 |
| WO | WO2016/118843 | 7/2016 |

OTHER PUBLICATIONS

International Search Report and Written Opinion for PCT/US2017/059792 dated Feb. 8, 2018.
Written Opinion of the International Preliminary Examining Authority for PCT/2017059792 dated Jul. 25, 2018.
Foreign Search Report on PCT PCT/US2017/059792 dated May 16, 2019.
Examination Report for EP Appln. Ser. No. 17801551.7 dated May 11, 2020 (5 pages).
Chinese translation of Guri, "Java 2 Graphic Design", Mechanical Industry Press, pp. 137-138.
Chinese translation of Jianzhu, "Android mobile game development from entry to mastery", China Railway Press, pp. 285-286.
Chinese Search Report Corresponding to Application No. 2017800501149 dated Apr. 24, 2022.

* cited by examiner

SYSTEMS AND METHODS FOR VALIDATING INTERACTION WITH THIRD-PARTY INTERACTIVE MEDIA

BACKGROUND

Computing devices, including mobile devices such as "smart" telephones and tablets, execute applications that may include functionality for presenting content such as offers or advertisements delivered to the devices via a network. In some instances, an application may provide a reward or benefit in exchange for engaging with presented content. However, interactions with the content might not be apparent to the application, which can limit the application's ability to provide such rewards or benefits.

SUMMARY

Although identifications of specific interactions with content (e.g. pushing button "one" vs. button "two") may be unavailable to another application, such as an operating system or application that instantiated the content player, the interaction events generally may be detected and captured for analysis (e.g. "a button was pushed at this time"). By evaluating, scoring, and aggregating these captured interaction events, the other application may generate an estimated likelihood that the user interacted with the content, and may provide or not provide the rewards accordingly. This may reduce false positives or false negatives, reducing user frustration, and potentially reducing bandwidth, processor, and battery consumption from erroneously downloading additional content for interaction responsive to a false assumption that the user did or did not interact with other content.

In some implementations, a client system presents, within an execution environment of an application, a third-party media stream distinct from the application, received from a remote host server via a network. The client system detects interaction events during presentation of the third-party media stream, and transmits descriptions of the detected interaction events to the remote host server. The client system updates a data set with data corresponding to the detected interaction event and applies an interaction heuristic to the data set to provide, to the application, an indicator of a likelihood of engagement with the third-party media stream. The application may then provide a reward based on the likelihood of engagement. In some implementations, the interaction heuristic is based on a number or frequency of interaction events, e.g., button utilization, screen taps, device motion, or screen changes detected during presentation of the received third-party media stream.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

An application executing on a client device may occasionally present third-party media to a user of the client device and wait for the user to engage with the third-party interactive media. If the user engages with the media, the application may reward the user, e.g., providing in-game incentives or real world premiums. However, because the presented media is from a third-party, the application is generally agnostic to the content of the third-party media and thus cannot independently determine or verify whether the user actually engaged with the interactive content. This may be resolved, however, by measuring user engagement during presentation of the third-party media and providing, to the application, an indicator of a likelihood that the user engaged with the presented media. This may allow the application to avoid false negatives (e.g., not providing a reward to a user that has performed the required engagement, frustrating the user) and false positives (e.g., providing a reward to a user that has not engaged with the content, but set down the device, randomly clicked, etc., wasting resources). In some implementations in which a reward may result in downloading of additional content for an application (e.g. new levels, tools, or other functionality), avoiding false positives may reduce network bandwidth and memory consumption, battery life, and processor cycles. Similarly, in some implementations, in which a reward may result in not downloading additional content (e.g. disabling advertisements or similar notifications), avoiding false negatives may reduce network bandwidth and memory consumption, battery life, and processor cycles. Furthermore, in some implementations in which content may be selected based on a user's interaction, such that the system may avoid downloading content the user is not interested in and instead download content that the user will be interested in, proper measurement of engagement may avoid wasted or unnecessary downloads, delays, and user frustration, further increasing engagement. The following description primarily focuses on interactive media, such as a preview presentation session or demonstration of an interactive application or game. However, some implementations of the following can also be used to measure engagement with non-interactive media such as a video preview or advertisement.

Figure 1:
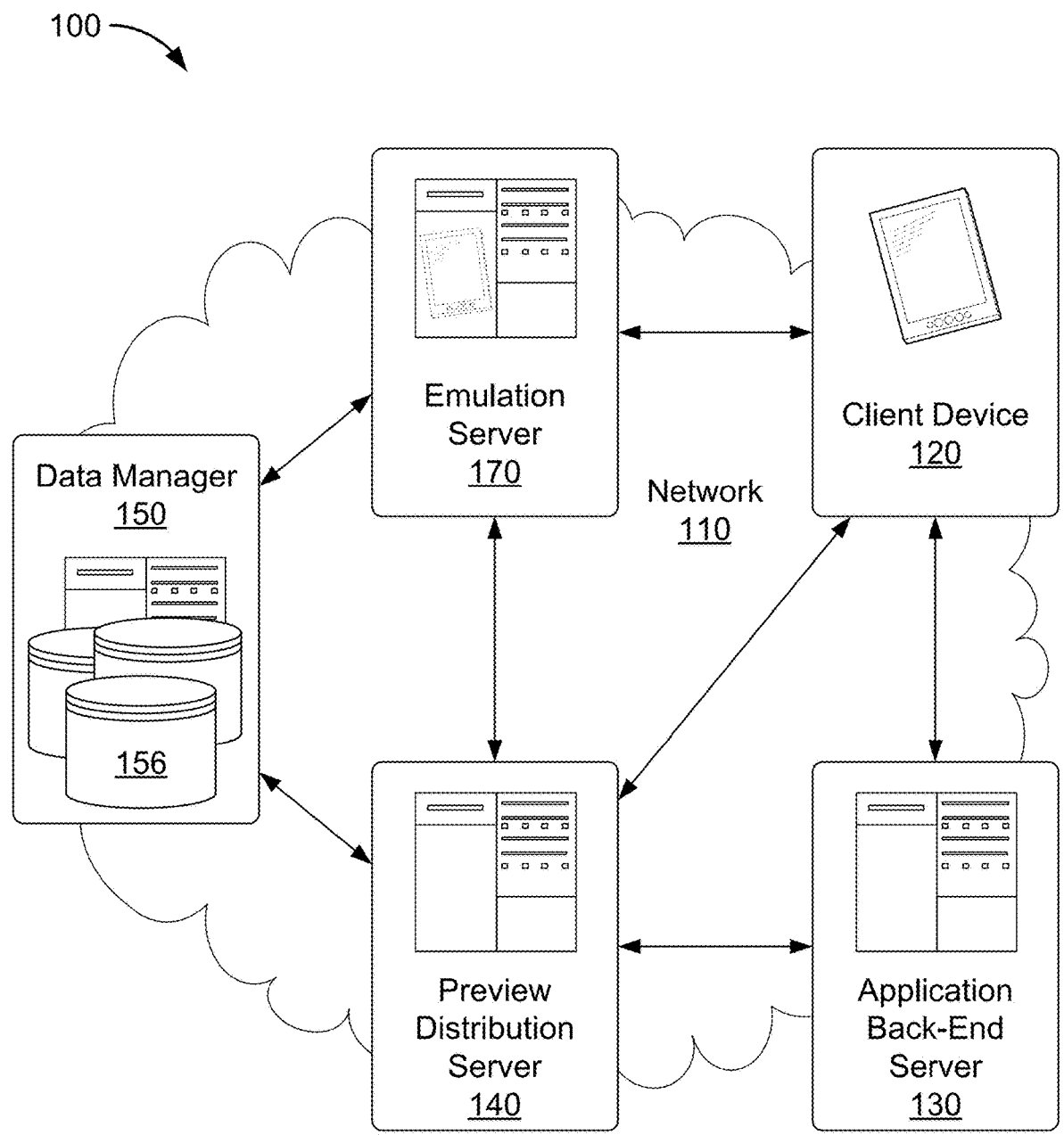
FIG. 1 is a diagram of an example preview system in a network environment.

FIG. 1 is a diagram of an example preview system in a network environment 100. The illustrated network environment 100 includes a network 110, an example client device 120, and several servers including an application back-end server 130, a preview distribution server 140, an emulation server 170, and a data manager 150 providing access to data storage devices 156.

In broad overview of FIG. 1, an application executing on the client device 120 may be a networked application that exchanges data with an application-specific back-end server 130. The application on the client device 120, or the application back-end server 130, may occasionally request third-party content to present on the client device 120, e.g., requesting a preview from the preview distribution server 140. The distribution server 140 selects content for presentation, e.g., a demonstration of an interactive application or game, and the client device 120 connects to a content host. For interactive applications or games, the content host is an emulation server 170 that executes a virtual machine emulation of the client device 120 and executes, on the virtual machine, an instance of the application or game to be demonstrated. An audio-visual media stream is sent from the emulation server 170 to the client device 120 for presentation. If a user of the client device 120 interacts with the presented audio-video stream, interaction data is sent back to the emulation server 170 where the interaction is recreated in the virtual machine. The emulation server 170 and the preview distribution server 140 may make use of data managed by the data manager 150 and stored in the data storage devices 156.

Still referring to FIG. 1, and in more detail, a network 110 enables communication between a client device 120 and the servers, e.g., the application back-end server 130, the preview distribution server 140, and the emulation server 170. In some implementations, data flows through the network 110 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 110 layered over an OSI layer-3 network protocol such as Internet Protocol (IP), e.g., IPv4 or IPv6. The network 110 is composed of various network devices linked together to form one or more communication paths between participating devices. Each networked device includes at least one network interface for receiving and/or transmitting data, typically as one or more data packets. An illustrative network 110 is the Internet; however, other networks may be used. The network 110 may be composed of multiple connected sub-networks. The network 110 can be a local-area network (LAN) such as a company intranet, a metropolitan area network (MAN), a wide area network (WAN), an inter network such as the Internet, or a peer-to-peer network, e.g., an ad hoc WiFi peer-to-peer network. The data links between devices in the network 110 may be any combination of wired links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation "3G," "4G," and "5G" protocols. The network may include short-range wireless links, e.g., via Wi-Fi, BLUETOOTH, or ZIGBEE, sometimes referred to as a personal area network (PAN) or mesh network. The network 110 may be public, private, or a combination of public and private networks. The network 110 may be any type and/or form of data network and/or communication network.

Figure 4:
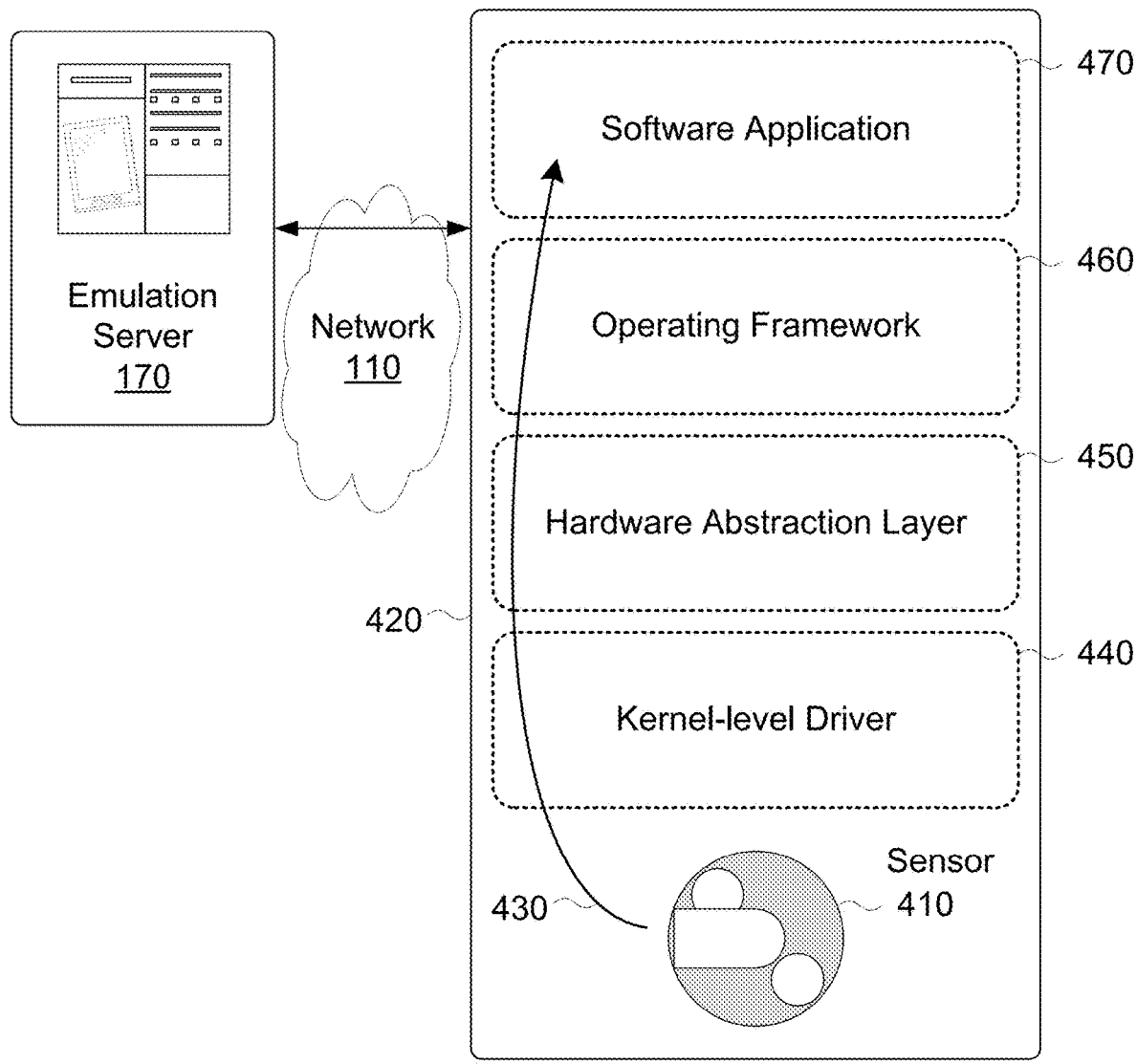
FIG. 4 is a diagram illustrating flow of data from a sensor on a client device.
Figure 7:
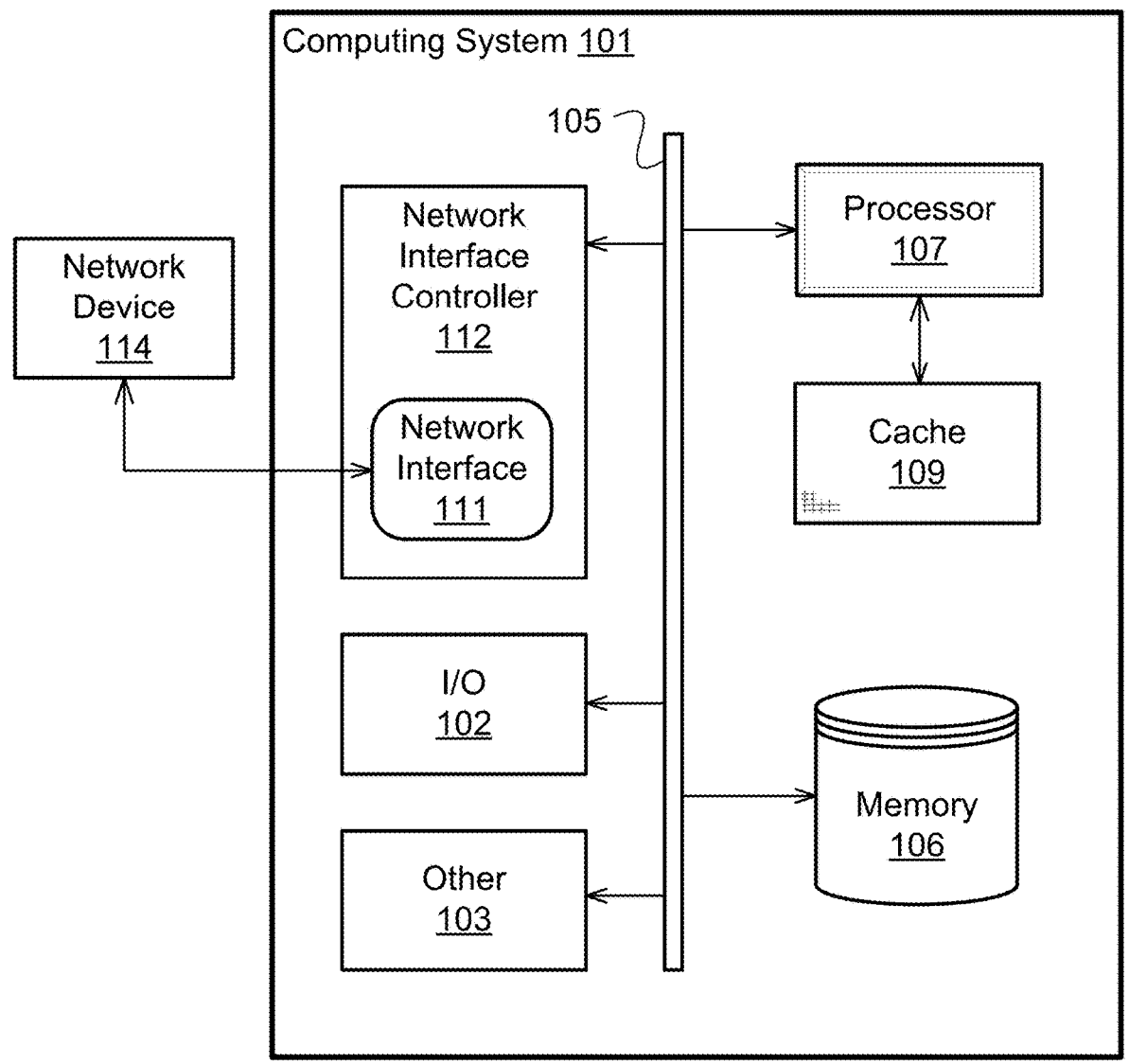
FIG. 7 is a block diagram of a computing system suitable for use in the various implementations described.

The example client device 120 is a computing system, or processor-based device, that executes applications, presents output to a user, and receives input from the user. The client device 120 is capable of exchanging information with the servers 130, 140, and 170 via the network 110. The client device 120 may be any kind of computing device, including, for example, a desktop computer, a laptop or notepad computer, a mobile device such as a tablet or electronic pad, a personal digital assistant, or a smart phone, a video gaming device, a television or television auxiliary box (also known as a "set-top box"), a kiosk, a hosted virtual desktop, or any other such device capable of exchanging information via the network 110. In some implementations, the client device 120 includes one or more hardware elements for facilitating data input and data presentation, e.g., a keyboard, a display, a touch screen, a microphone, a speaker, and/or a haptic feedback device. In some implementations, the client device 120 includes buttons, e.g., function-specific buttons (e.g., audio device volume controls such as volume up, volume down, mute, etc.) and/or function-agnostic buttons (e.g., a "soft" button that can be assigned specific functionality at a software level). In some implementations, the client device 120 includes a sensor capable of detecting movement of the client device 120 itself, e.g., an accelerometer, gyroscope, or tilt-sensor. An accelerometer may be a single or multi-axis accelerometer. In some implementations, the client device 120 is implemented using special purpose logic circuitry, e.g., an application specific integrated circuit (ASIC). In some implementations, the client device 120 is implemented using a general purpose processor. FIG. 4, described in more detail below, is a diagram illustrating flow of data from a sensor on a client device suitable for use as the client device 120 shown in FIG. 1. FIG. 7, described in more detail below, illustrates a computing device that, in some configurations, is suitable for use as a client device 120.

In some implementations, the client device 120 runs an operating system managing execution of software applications on the client device 120, including one or more software applications capable of presenting a media stream from the emulation server 170. In some implementations, the operating system is provided with the client device 120. In some implementations, the client device 120 executes a browser application (e.g., a web browser) capable of receiving data formatted according to the suite of hypertext application protocols such as the Hypertext Transfer Protocol (HTTP) and HTTP encrypted by Transport Layer Security (HTTPS). In some such implementations, the browser facilitates interaction with the data visualization platform 130 in the form of one or more web pages. In some implementations, the browser application is provided with the client device 120. In some implementations, the client device 120 executes a custom application, e.g., a game or other application that interacts with the application back-end server 130. Interactions between the custom application and the application back-end server 130 may use standard protocols such as HTTP and HTTPS, or may use application-specific protocols, e.g., a custom application-layer protocol implemented over a transport-layer protocol such as TCP or SCTP. In some implementations, the client device 120 includes a tool for obtaining and/or installing the custom application on the client device 120. In some implementations, one or more of the servers with which the client device 120 communicates supports a custom instruction set, e.g., an application programming interface (API), and the custom application executed on the client device 120 implements the API. An application can implement an API using, for example, a library or software development kit (SDK) provided to the application's developer.

The client device 120 communicates (or exchanges data) with various servers such as the application back-end server 130, the preview distribution server 140, and the emulation server 170. In some implementations, one or more of these servers are implemented using special purpose logic circuitry, e.g., an application specific integrated circuit (ASIC). In some implementations, one or more of these servers are implemented using a general purpose processor. FIG. 7, described in more detail below, illustrates a computing device that, in some configurations, is suitable for use as the application back-end server 130, the preview distribution server 140, and/or the emulation server 170.

In FIG. 1, the application back-end server 130 provides back-end support to an application executing on the client device 120. In some implementations, the application back-end server 130 runs a service that receives data from the client device 120 and sends data to the client device 120. For example, the application executing on the client device 120 may be a game, e.g., a multi-player game where game data for the different players is stored by the application back-end server 130; the application executing on the client device 120 may be a utility where some functions for the application are provided by the application back-end server 130; or any other sort of user-interactive application that utilizes a back-end server 130 for support. In some implementations, storing data remotely from the client device 120 allows for asynchronous interaction between multiple users or user devices, and provides an avenue for recovery in the event of a client device 120 failure.

In some implementations, the preview distribution server 140 receives a request to provide specific third-party content and, responsive to the request, directs the client device 120 to obtain the content from the emulation server 170. In some implementations, the preview distribution server 140 is an advertising network server. In some implementations, the preview distribution server 140 runs a service identifying third-party content for presentation on the client device 120. When an application executing on the client device 120 presents third-party content, the application generates a request to the preview distribution server 140, the preview distribution server 140 then responds with a selection of third-party content. The content itself may be served from the preview distribution server 140 or from the emulation server 170, or from another server (not illustrated), such as a content storage server or content delivery network (CDN). For example, if the selected third-party content is an interactive preview, the interactive preview is served by the emulation server 170.

In some implementations, the preview distribution server 140 is an advertising network server. Advertisement networks provide advertising placement services. An application developer can use the advertisement network to place advertisements within an application and receive compensation from advertisers for ads placed through the advertising network. In some advertising networks, advertisers pay for presentation events (referred to as "impressions"). In some advertising networks, advertisers pay when a recipient of advertisement clicks on (or otherwise selects) an advertisement and is taken to a transaction interface such as a landing page or application store. These clicks (or selections) are referred to as a "click through" event. In some advertising networks, advertisers pay different amounts for impressions and click-through events; in some cases, not paying for impressions at all. In some advertising networks, an advertiser pays for an impression only if a recipient of the advertisement engaged with the advertisement. Accordingly, the advertising network may offer an advertisement option in which an end user is offered an opportunity to obtain a reward in exchange for viewing or engaging with an advertisement. This is referred to as a "rewarded ad." For example, a rewarded ad might be presented in a game application such that a game player could earn "in-game" rewards by watching the rewarded ad. The player's in-game reward could be, for example, in-game currency, extra player "lives," recovery from an in-game terminal event, additional playing time, and so forth. In some implementations, the rewarded ad is a playable application streamed from an advertising network server (e.g., the emulation server 170). In some implementations, the playable application is a functional demonstration version of a full-feature application available for installation. In some implementations, the rewarded ad plays for a predetermined number of seconds (a preview presentation session allotment time), during which the end user is expected to engage with the presented advertisement, e.g., to play a sample game for a few seconds. In some implementations, the rewarded ad is presented within the context of a first application, e.g., the first game, and the first application effectively transfers interface control to the demonstration application being presented. Because of this, the first application does not necessarily have sufficient information to determine whether the user actually engaged with the content presented in the rewarded ad. In some implementations, an event handler or event monitor on the client device provides the first application with a likelihood that the user engaged with the content presented in the rewarded ad.

The data manager 150 provides data storage and management services persisting data in memory 156. The memory 156 may be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks (SAN), network attached storage (NAS), and redundant storage arrays.

The data manager 150 controls access to the memory 156. In some implementations, the data manager 150 hosts a query engine. In some implementations, the data manager 150 hosts a relational database, e.g., using a Relational Database Management System (RDBMS). In some implementations, the data manager 150 manages data in the memory 156 as files, e.g., XML files. In some implementations, the data manager 150 regulates access to data or features using credentials or account management utilities. In some such implementations, credential or account information is stored by the data manager 150 in the memory 156.

A database, or more specifically a database management system (DBMS), organizes data in accordance with a database definition, e.g., a database schema. In a basic relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In a relational database, each entry in a column in a table is also in a row associating the entry with entries from other columns in the table. In some instances, an entry will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, XML databases, NoSQL databases, and so forth. Many of these database types use tables, or table-like structures, in a manner similar to that described above in reference to relational databases. A client or user of a database can add data to, modify data in, or retrieve data from the database using database instructions, e.g., queries in a database query language such as the Structured Query Language (SQL). One or more database instructions may be grouped together into a database transaction. Traditionally, a database provides transaction atomicity, consistency, isolation, and durability. These properties are known by the acronym "ACID." In some implementations, the data manager 150 provides a knowledge base with all of the ACID properties. However, in some implementations, the data manager 150 does not provide all of the ACID properties.

In some implementations, one or more of the servers 130, 140, and 170, are in communication with the data manager 150, e.g., via a direct link or the network 110. In some implementations, one or more of the servers 130, 140, and 170, obtain data from the data manager 150 using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the servers 130, 140, and 170, obtain data from the data manager 150 using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the servers 130, 140, and 170, obtain data from the data manager 150 using natural language or semantic queries. In some implementations, one or more of the servers 130, 140, and 170, obtain data from the data manager 150 using queries in a custom query language such as a Visualization API Query Language.

The emulation server 170 provides third-party content to the client device 120. In some implementations, the emulation server 170 runs a media streaming service that streams media to a client device 120 via the network 110. In some implementations, the media stream is transmitted using a standard protocol such as TCP or SCTP. In some implementations, the media stream is transmitted using a custom protocol. In some implementations, the media stream is unidirectional such that a client device 120 can receive the stream but has no means of modifying the content of the stream. In some implementations, the media stream is interactive such that a client device 120 has a means of modifying the content of the stream. For example, in some implementations, the emulation server 170 receives instructions from the client device 120 for modifying the stream content and the emulation server 170 modifies or updates the stream content in accordance with the received instructions.

In some implementations, the emulation server 170 runs a virtualized version of the client device 120. For example, in some implementations, the emulation server 170 is a hypervisor running a virtual machine from an image of the client device 120. In some such implementations, the emulation server 170 running a virtualized version of the client device 120 generates a media stream from the virtualized device, e.g., streaming an audio-video composite from the virtualized device audio output buffer and graphics display buffer. The media stream is transmitted by the emulation server 170 to the client device 120, where it can be presented by the client device 120. A user of the client device 120 may interact with the client device 120, e.g., clicking or tapping on elements presented in the media stream. These interactions are captured at the client device 120 and transmitted to the emulation server 170, where they are recreated by the emulation server 170 for the virtualized version of the client device 120. In this manner, the user of the client device 120 has an experience of interacting with the virtualized version of the client device 120 as though the interaction was with the actual client device 120. An application can be installed on the virtualized version, and the user can interact with the application, without the application being installed on the actual client device 120. In some implementations, the virtualized version of the client device 120 is virtualized from a stock image of a generic client device 120. In some implementations, the virtualized version of the client device 120 is virtualized from a stock image of a generalized client device 120 having some properties in common with a specific client device 120. For example, the client device 120 and virtualized version may run identical operating system versions, may have matching display sizes or display quality levels, and/or may have equivalent memory parameters. By having properties in common, the user experience interacting with an application installed on the virtualized device will closely match the user experience interacting with the application installed on the client device 120. However, when the application is installed and executing on the virtualized device, it does not need to have been installed on the client device 120.

In some implementations, the client device 120 executes an emulation presentation interface that receives the media stream from the emulation server 170 and presents it at the client device 120. Presenting the media stream may include presenting a visual portion of the media stream, presenting an audio portion of the media stream, or presenting both a visual and an audio portion of the media stream. In some implementations, the media stream includes force feedback data and the client device 120 presents the force feedback data while presenting the media stream, e.g., by vibrating the client device 120 or using other haptic feedback devices built into the client device 120.

In some implementations, the emulation presentation interface executed by the client device 120 captures user interaction event data. Interaction event data may include, for example, mouse clicks, touch screen taps, button depressions, sensor actuation, and movement of the client device 120 (measured, e.g., by an accelerometer, gyroscope, or other motion sensor built into the client device 120). The emulation presentation interface captures this interaction data and transmits data representative of the captured interaction to the emulation server 170. In some implementations, the emulation presentation interface captures interaction data by hooking sensor input interface libraries.

The client device 120 may execute a first application that includes presentation of third-party content received from the emulation server 170. The first application may load the emulation presentation interface and present it to a user within a program context for the first application. In some such implementations, the first application does not have access to the interaction inputs directed to the emulation presentation interface.

In some implementations, the first application may provide a reward or incentive to a user of the first application in exchange for the user engaging with third-party content presented in the emulation presentation interface. For example, the first application may be a game in which a user can earn in-game incentives, player "lives," virtual currency used to purchase in-game elements, and so forth. The user may receive an incentive for watching an audio-visual presentation, e.g., a video advertisement. The user may receive an incentive for interacting with interactive third-party content, e.g., a demonstration of another application the user might wish to install. The user might not receive the incentive, or might receive a lessor incentive, if the first application determines that the user did not watch, or did not engage and interact with, the third-party content. In some implementations, the emulation presentation interface provides, to the application loading the emulation presentation interface, and indicator of how likely it is that the user engaged with third-party content presented by the emulation presentation interface. The first application can then provide an incentive or reward level tied to the user's engagement with the third-party content. For example, if a user places the client device 120 screen-side down on a surface while a video advertisement is presented by the client device 120, the emulation presentation interface may return a low user engagement indicator and the first application may decline to provide a promised incentive. Likewise, as another example, if a user actively engages with the client device 120 while interactive media is presented by the client device 120, the emulation presentation interface may return a high user engagement indicator and the first application may provide a promised incentive.

Figure 2A:
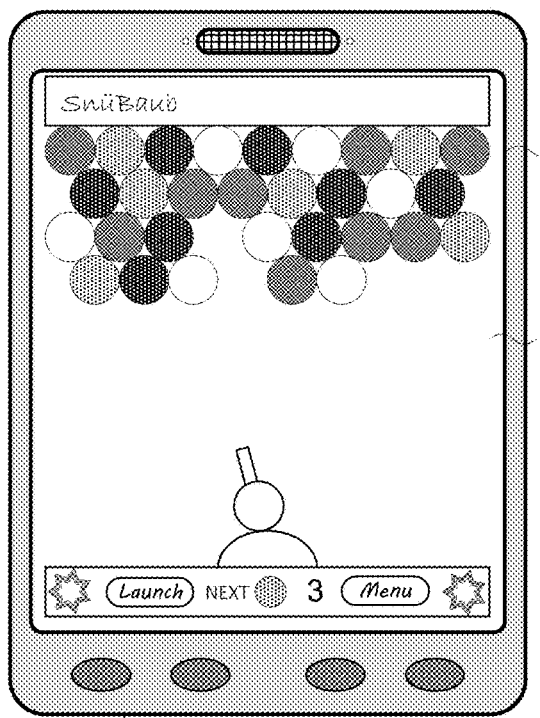
FIG. 2A, FIG. 2B, FIG. 2C, and FIG. 2D are illustrations of an example device displaying different stages of an application presenting a demonstration application in a preview presentation session.
Figure 2B:
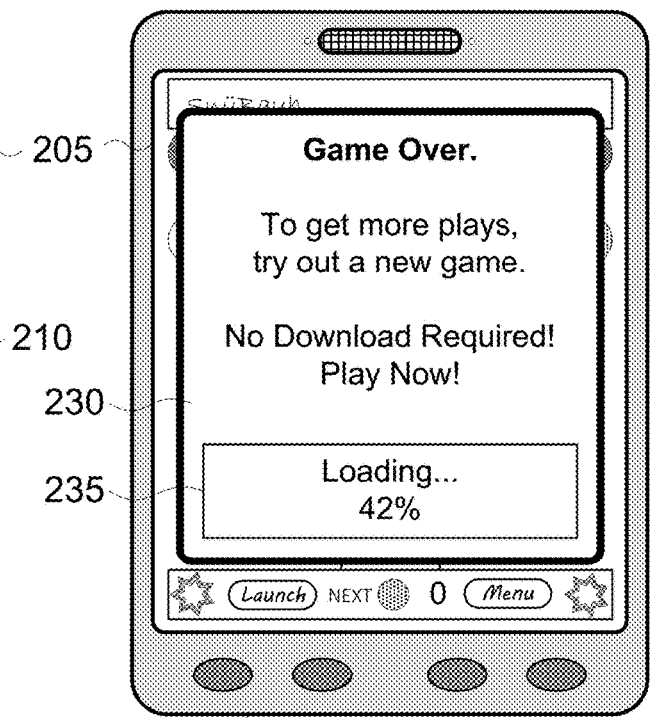
Figure 2C:
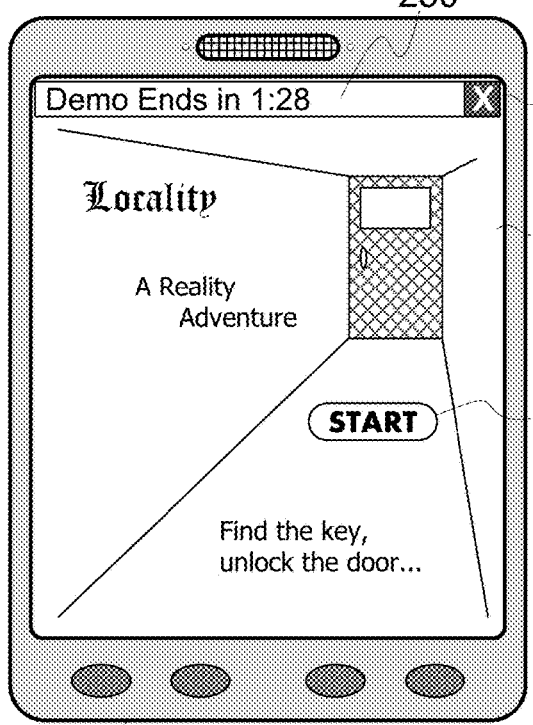
Figure 2D:
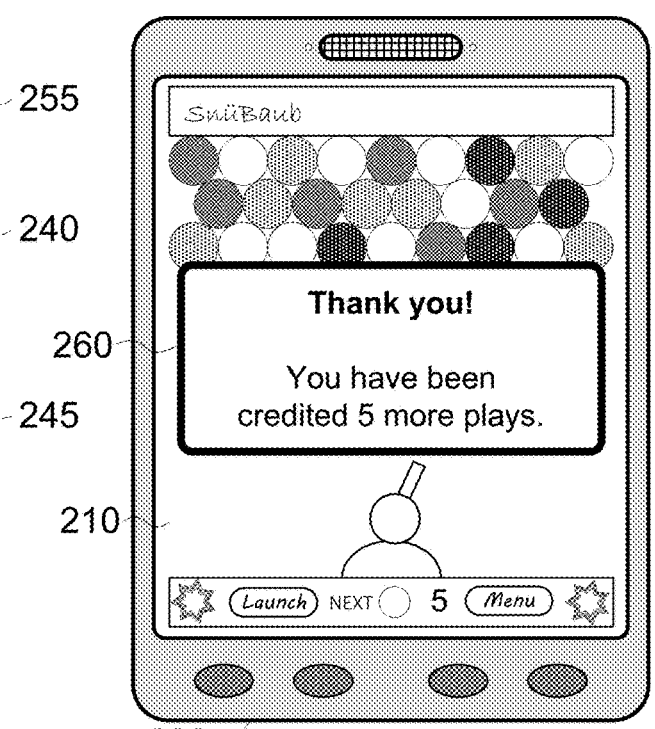

FIG. 2A, FIG. 2B, FIG. 2C, and FIG. 2D are illustrations of an example touch-screen device 200 displaying different stages of a game rewarding a player for engaging with a demonstration application in a preview presentation session. Although shown as games, in many implementations, either or both applications may be any type and form of application including spreadsheet applications, database applications, word processing applications, banking utility applications, social network applications, educational applications, or any other such applications. In broad overview, and referring to the example shown in FIG. 2A, the touch-screen device 200 displays, on a screen 205, an example application graphical user interface (GUI) 210. The application GUI 210 is for a game in which a player (a user of the touch-screen device 200) earns play opportunities by engaging with a demonstration of another application, i.e., a demo game. When a player has exhausted a bank of play opportunities (e.g., lives, rounds, etc.), the player is presented with a preview presentation session for a demo game. After the preview presentation session has ended, based on the player engaging with the other application, the player is rewarded with additional play opportunities (plays). FIG. 2B is an illustration of a transition screen 230 that may be presented at the beginning of a preview presentation session, e.g., when the player has exhausted the bank of play opportunities. FIG. 2C is an illustration of the example touch-screen device 200 displaying a GUI 240 for the demo game during the preview presentation session. FIG. 2D is an illustration of a reward message 260 presented after the preview presentation session, e.g., responsive to the player having engaged with the demo game.

Referring to FIG. 2A in more detail, the touch-screen device 200 is an example of a client device 120 in which a user interacts with the touch-screen device 200 by tapping, swiping, or otherwise touching a screen 205 on the touch-screen device 200. In FIG. 2A, the screen 205 is displaying an example application GUI 210 for a first game. The illustrated example game allows a user to have a limited number of plays before the user needs to earn more play opportunities. In this example, the first game hosts a preview presentation session in which a user can demo another application (a demo game) in order to earn more play opportunities in the first game.

FIG. 2B is an illustration of a transition screen 230 that may be presented at the beginning of a preview presentation session, e.g., when the player has exhausted the bank of play opportunities. As depicted in FIG. 2B, the touch-screen device 200 presents a transition screen 230 with a message box explaining that the user should interact with the other application, a demo game, in order to obtain additional plays within the first application. The transition screen 230 makes it clear that the demo game can be played during the preview presentation session without installing the demo game on the touch-screen device 200. The playable demo game is provided in the preview presentation session from a remote server to the local device in a manner that does not require installation on the local device. For example, referring to FIG. 1, an emulation server 170 can support interaction with an application on a client device 120 without installing the application on the client device 120.

In the example depicted in FIG. 2B, the transition screen 230 includes a visual element 235 indicating that the demo game is loading. In some implementations, the visual element 235 is an animated graphic, e.g., an hourglass or pinwheel. In some implementations, the visual element 235 is updated responsive to an indicator received from the demo game.

FIG. 2C is an illustration of the example touch-screen device 200 displaying a GUI 240 for the demo game during the preview presentation session. The GUI 240 shown in FIG. 2C is an example splash screen for the playable demo game. A message bar 250 is shown above the splash screen indicating that the preview presentation session for the demo game is a time-limited preview. An escape button 255 is also shown. In some implementations, the preview presentation session has a predetermined time limit. However, in some such implementations, a user may be allowed to quit or exit the preview presentation session before the predetermined time has elapsed, e.g., by clicking or selecting the escape button 255. In some implementations, the escape button 255 is not shown (or is disabled) during an initial period of the preview presentation session, and is then shown (or enabled) after the initial period. In some implementations, the initial period is percentage of the predetermined time for the preview presentation session. In some implementations the initial period is a fixed length of time, e.g., 15 seconds. In some implementations, the initial period ends a fixed length of time after the demo game has finished loading.

In some implementations, the visual element 235 (shown in FIG. 2B) indicating that the demo game is loading is displayed over the splash screen from the demo game itself, instead of the transition screen 230. In some implementations, no transition screen 230 is used. Instead, the splash screen introducing the demo game is shown and a message is displayed indicating that the demo game is "playable."

When the demo game has loaded, it may present an interface for user engagement. For example, as shown in FIG. 2C, the demo game may present a "start" button 245. In some implementations, the demo game might present a control interface, instructions for play, or some other indicator that the game is ready for user interaction. A user may then engage with the demo game, e.g., tapping on the "start"

button 245, tapping playable elements of the demo game, moving the touch-screen device 200 to actuate internal motion sensors, and so forth. As discussed above, the location of the playable elements of the game such as button 245 may be unknown or unavailable to a host application, operating system of the device, or client agent. Detecting interactions with such elements may be performed via the indirect systems and methods discussed herein. When the preview presentation session time has ended, or when the user selects the escape button 255, the host application receives an indicator of whether the user engaged with the demo game.

FIG. 2D is an illustration of a reward message 260 presented after the preview presentation session, e.g., responsive to the player having engaged with the demo game. In FIG. 2D, the first game GUI 210 is displayed with a message box 260 explaining the reward provided responsive to the user having engaged with the demo game during the preview presentation session.

Figure 3:
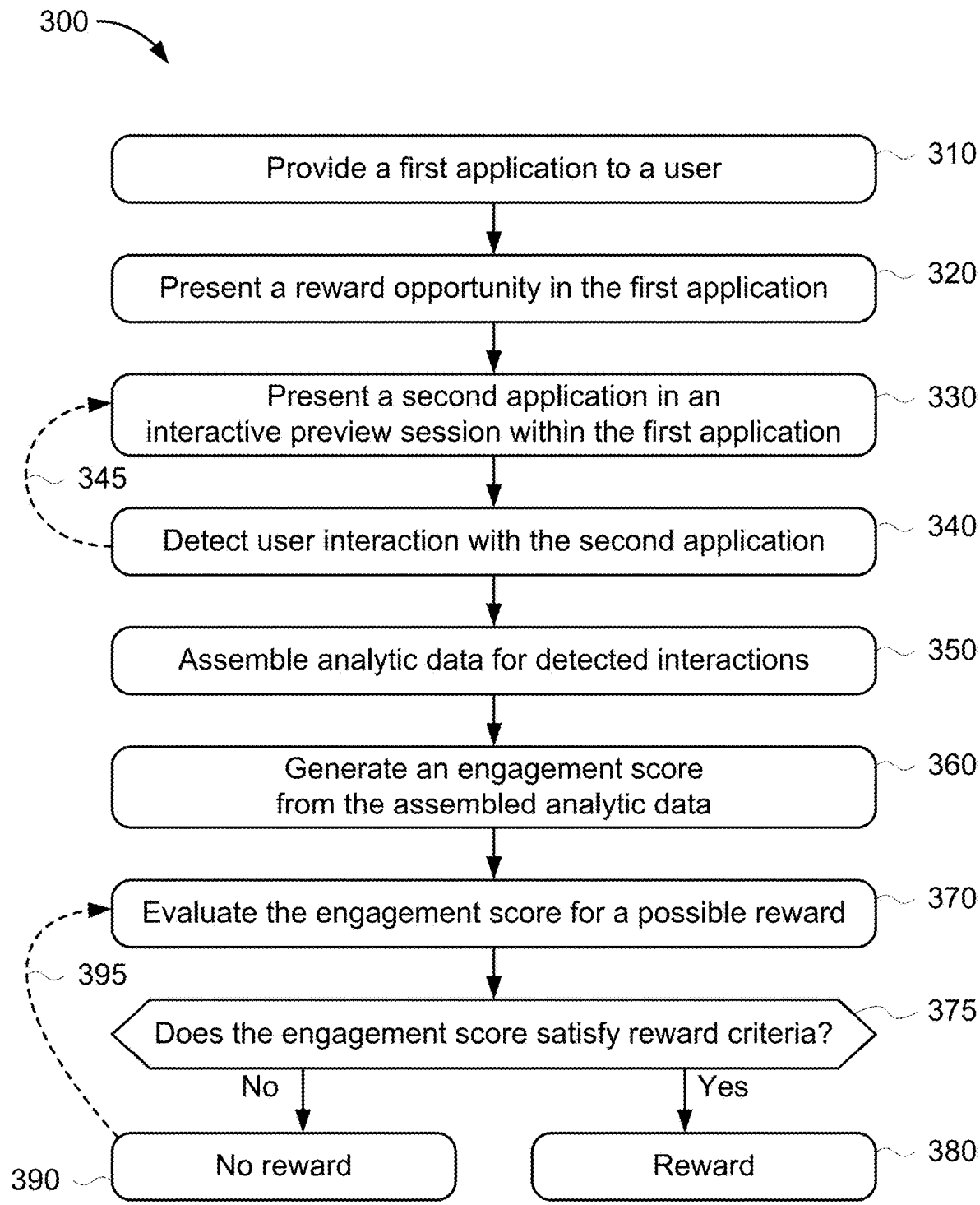
FIG. 3 is a flowchart for an example user interaction to obtain a reward based on engagement with third-party content.

FIG. 3 is a flowchart for an example user interaction 300 to obtain a reward based on engagement with third-party content. The illustrations in FIG. 2A, FIG. 2B, FIG. 2C, and FIG. 2D are for one example of such a user interaction, and are referenced as examples in the following description of FIG. 3. However, these illustrations are merely examples of an example application executing on a client device, presenting a reward opportunity, presenting interactive third-party content, and presenting a reward. These examples are not meant to be limiting.

Referring to FIG. 3 in broad overview, throughout the user interaction 300, a user interacts with applications presented on a client device (e.g., the client device 120 shown in FIG. 1). There is a first application, which may be executed locally on the client device, and a second application presented within the context of the first application, but may be executed remotely, e.g., on an emulation server 170 (as shown in FIG. 1). In the interaction 300, at stage 310, the client device provides a first application to a user. At stage 320, the client device presents a reward opportunity in the first application. At stage 330, the client device presents a second application in an interactive preview session within the first application. At stage 340, the client device detects user interaction with the second application. As indicated by arrow 345, stage 330 and stage 340 continue throughout the interactive preview session, allowing for multiple user interactions to be detected over the course of the presentation of the second application. At stage 350, the client device assembles analytic data for detected interactions. At stage 360, the client device generates an engagement score from the assembled analytic data. At stage 370, the client device, via the first application, evaluates the engagement score for a possible reward. Evaluating the engagement score includes determining, at stage 375, whether the engagement score satisfies one or more reward criteria. If the reward criteria is satisfied, then at stage 380, the first application provides the reward to the user. Otherwise, at stage 390, the first application does not provide the reward. In some implementations, there may be multiple reward options, each associated with different reward criteria. In some such implementations, the rewards are hierarchical, such that if an engagement score does not satisfy reward criteria for a first reward, the client device repeats (indicated by arrow 395) the evaluation in stage 370 with reward criteria for a lesser reward.

Referring to FIG. 3 in more detail, at stage 310, the client device provides a first application to a user. The first application is executed by the client device in an execution environment. The execution environment may include, for example, the operating system and any dynamic load libraries provided by the operating system. In some implementations, the execution environment includes device drivers, sensor managers, and the like. In some implementations, the execution environment includes an operating system kernel where the kernel includes device drivers. In some implementations, the execution environment includes a hardware abstraction layer. The first application may be a software utility, a social media application, a game, or any other application that could be executed on a client device. The user interacts with an interface on the client device to interact with the first application. For example, the user may interact with the first application by physically touching a touch-screen on the client device (e.g., as described above in reference to the example graphical user interface 210 on the touch-screen device 200 illustrated in FIG. 2A). In some implementations, the user may interact with the first application by tapping on a screen, depressing buttons on the client device, by moving or shaking the client device (actuating a device motion sensor), or by speaking to a microphone on the client device. In some implementations, the client device includes a camera and the user interacts with the first application via the camera.

At stage 320, the client device presents a reward opportunity in the first application. The reward opportunity is an opportunity to earn something (an incentive) by watching or engaging with third-party content, e.g., previewing another application. The incentive may be a reward within the application itself or may be access to something external to the application. For example, if the application is a game, the incentive might be additional "plays" or "lives" within the game, access to additional in-game resources, levels, or features, a grant of additional in-game currency or credit, additional playing time, acceleration of time-delayed in-game elements, and so forth. If the application is a utility, e.g., a photography editing program or presentation utility, the incentive might be access to additional tools, filters, custom graphics, clip-art, "stickers," and so forth. Some applications may rely on back-end servers, e.g., the application back-end server 130 shown in FIG. 1, and the incentive may be tied to resource utilization on the back-end server. For example, the application may include functionality that is performed on the back-end server and the user may be rewarded with access to the back-end functionality based on engagement with the third-party content. In some implementations, the incentive is external to the application. In some implementations, the incentive is a coupon or ticket redeemable at a restaurant, retail store, amusement park, theater, performance venue, equipment rental location, service provider, and so forth. In some implementations, the incentive is an entry into a drawing or raffle. The incentive can be anything the application uses to reward a user for engaging with the third-party content.

At stage 330, the client device presents a second application in an interactive preview session within the first application. The interactive preview presentation session is an opportunity for the user to engage with the third-party content, i.e., the second application. In some implementations, the application presents the third-party content to a user by instantiating an interactive preview presentation session through a function call to an application programming interface (API). In some implementations, the application presents the third-party content to a user by instantiating an interactive preview presentation session using utilities provided in a software developer kit (SDK). In some implementations, the application presents the third-party content to a user by instantiating an interactive preview presentation session through a function call to a dynamic load library (DLL). In some implementations, the second application is presented within a display window framed by the first application. For example, in FIG. 2B, the transition screen 230 is shown presented in a display window framed by the first application. In some implementations, this window is used to present the second application. When presented within such a window, the second application is clearly presented within the context of the first application. The smaller display space of the window may also reduce variation between presentation devices (that is, the framing portion of the display may vary between devices with different screen sizes or resolutions, while allowing the window itself to have a more consistent size and resolution). In some implementations, the second application is presented using the entire screen. For example, in FIG. 2C, the graphical user interface (GUI) 240 shown is an example splash screen for a playable demo game using the entire screen 205 on the illustrative touch-screen device 200, where a message bar 250 with an escape button 255 is layered over the GUI 240. When presented using the entire screen 205, the second application is presented in the same manner in which it would be viewed by a user should the user install the second application on the client device. That is, by using the entire screen 205, the user receives a preview experience similar to having the second application running natively.

At stage 340, the client device detects user interaction with the second application. From the perspective of the user, the second application presented at the client device is interactive. The user can engage with any interface the second application presents, e.g., by tapping on virtual buttons displayed on a touch-sensitive screen. In some implementations, the user can interact with the second application by pressing or actuating physical buttons on the client device. In some implementations, the user can interact with the second application by rotating, tilting, shaking, or otherwise physically moving the client device. Generally, any mode of interaction the user might use to interact with a locally installed application can be used to interact with the second application, even though the second application is not installed locally. These interactions occur at the local device, where each interaction event is received by one or more sensors on the local device and handled by the execution environment. For example, if a user rotates the client device, this activity is detected by a motion sensor (e.g., an accelerometer, gyroscope, or tilt-switch) and handled by device drivers or sensor managers in the execution environment. The client device translates the detected motion into a software event or signal, which is then reported to the first application, or to the second application. In some implementations, the second application is executing in a virtualized environment on the emulator server 170 and the client device transmits the interaction event description to the emulator server 170 where it is provided to the second application. The flow of data from the sensors to applications is discussed in more detail below, in reference to FIG. 4.

As indicated by arrow 345, stage 330 and stage 340 continue throughout the interactive preview session, allowing for multiple user interactions to be detected over the course of the presentation of the second application.

Figure 6:
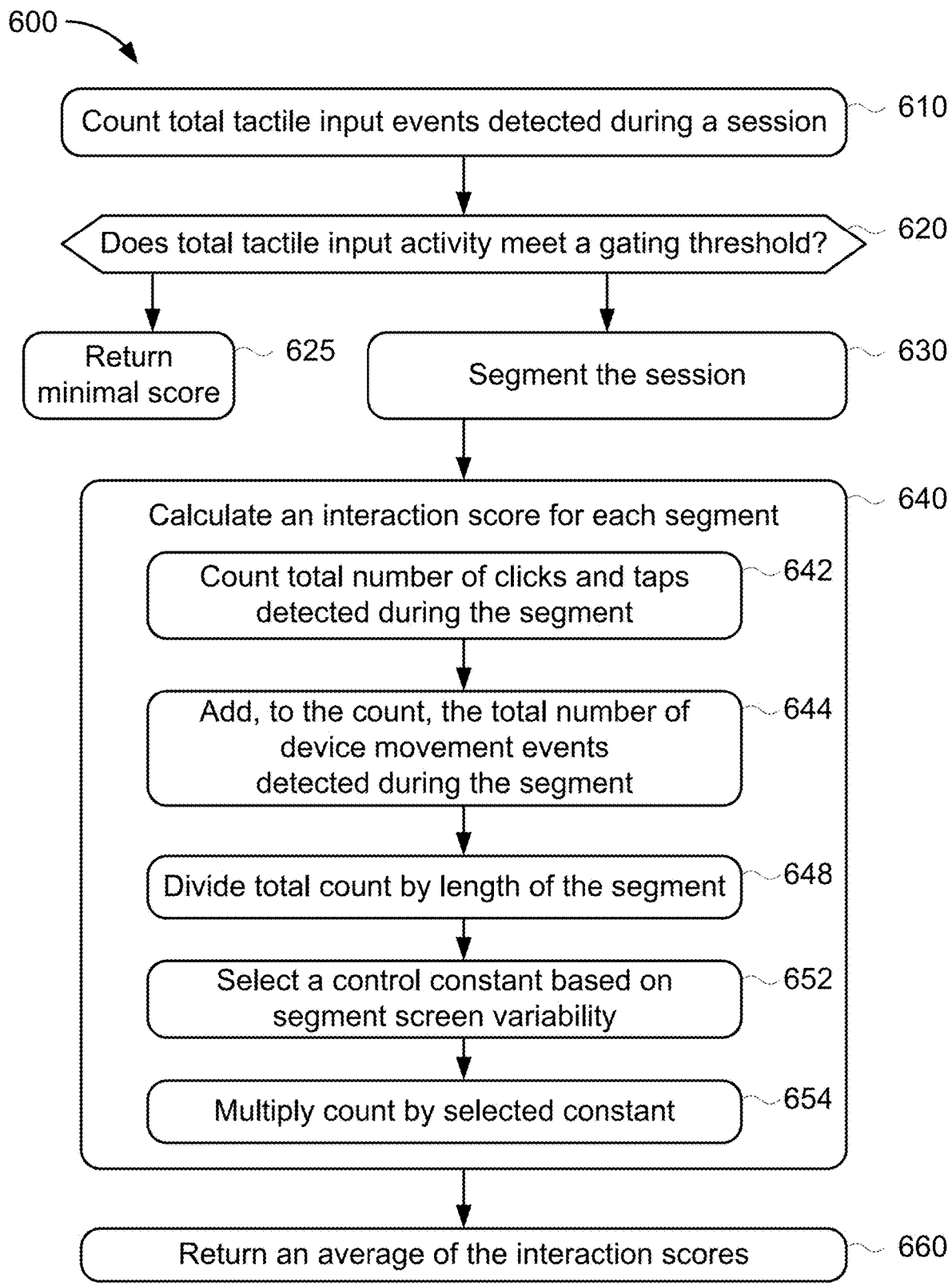
FIG. 6 is a flowchart for an example implementation of a heuristic for user engagement.

At stage 350, the client device assembles analytic data for detected interactions. The first application provides the user with access to the second application without any internal information regarding the content or interface of the second application. That is, the first application is agnostic to the content of the second application. Accordingly, the first application does not have enough information to recognize, on its own, whether a user engaged with the second application. However, the client device can determine a likelihood that a user is engaging with an application based on the interactions received. A score is generated that represents this likelihood and returned to the first application. For example, in some implementations, an analyzer applies a heuristic to events that are detected during the preview session to generate the score. FIG. 6, described in more detail below, is a flowchart 600 for an example implementation of a heuristic for user engagement. The first application can then provide a reward tailored to the likelihood that the user engaged with the second application.

At stage 360, the client device generates an engagement score from the assembled analytic data. In some implementations, an engagement module obtains data for various engagement metrics and uses a heuristic to determine, from the obtained engagement metrics, whether the user was likely to have engaged with the second application. Metrics include whether the user tapped (which includes any form of touch or click) on any part of a screen, locations and timing of such taps, variations in locations and timing of such taps, buttons actuated, motion of the client device itself (e.g., whether the device was in a fixed location suggesting a desk or table, or whether it was moved about suggesting it was held in the user's hand), and screen display state trajectories (if the screen becomes stable, waiting for user interaction, then subsequently changes, this may indicate engagement or interaction). The engagement module may obtain the metric data from various sources including, but not limited to, hooking a touchscreen user interface library, accessing an internal accelerometer, and/or capturing occasional screen snapshots or screen pixel samples. Further examples of generating the engagement score are presented below. For example, FIG. 6, described in more detail below, is a flowchart 600 for an example implementation of a heuristic for user engagement.

In some implementations, the engagement module reports (via a network) obtained data back to a remote server designated for collecting interaction indicator data. In some implementations, the engagement module processes the obtained data locally on the client device without transmitting it to a remote server. An analytics module processes the obtained data using an engagement heuristic to determine a likelihood of engagement. This likelihood is then returned to the application via the API, so that the application can provide the user with the proper reward.

At stage 370, the client device, via the first application, evaluates the engagement score for a possible reward. Possible rewards may be contingent on one or more factors, including whether or not (and to what extent) a user engaged with the second application presented in the interactive preview session. In some implementations, to receive a reward, a corresponding set of criteria needs to be satisfied. For example, the reward criteria may require that an engagement score representing the likelihood that a user engaged with the second application be above a corresponding threshold. In some implementations, the reward criteria may include additional factors. For example, a reward might include a financial incentive, but only for users who reside in jurisdictions where the financial incentive is available. In some implementations, there may be multiple possible rewards and, at stage 370, each possible reward is considered (as represented by arrow 395).

At stage 375, the client device, via the first application, determines whether the engagement score satisfies one or more reward criteria. In some implementations, the first application compares the engagement score to a predetermined threshold and, if the score satisfies or exceeds the threshold, then the engagement score is sufficient for the reward. In some implementations the engagement score is compared to various ranges, each associated with a corresponding reward. That is, if the engagement score indicates a high likelihood of engagement, a first reward is provided, and if the engagement score indicates a lower likelihood of engagement, a second reward, lesser than the first reward, is provided. The first application receives the engagement score from a developer kit or API, and can determine the reward level based on the engagement score received.

If the reward criteria is determined to be satisfied at stage 375, then at stage 380, the first application provides the reward to the user. In some implementations, the reward is an in-application or in-game reward. For example, if the first application is a game, the reward might be additional "plays" or "lives" within the game, access to additional in-game resources, levels, or features, a grant of additional in-game currency or credit, additional playing time, acceleration of time-delayed in-game elements, and so forth. In other implementations in which the first application is not a game, the reward may be additional time to use the first application, additional tools or resources for use in the first application (e.g. clip art, fonts, etc.), or other such benefits or functionality. In some implementations, the reward may have value outside of the first application. For example, the reward might be a code redeemable for credit from an online store. Other examples include movie tickets, access to entertainment venues, access to early previews, and so forth.

If the reward criteria is determined not to be satisfied at stage 375, then at stage 390, the first application does not provide the reward to the user. In some implementations, the first application provides feedback to the user regarding why the reward was not provided. In some implementations, as indicated by arrow 395, when there are alternative lesser rewards available, the interaction 300 may return to stage 370 to evaluate reward criteria corresponding to the available reward options.

FIG. 4 is a diagram illustrating an example flow of data from a sensor on an example device. In the diagram, a sensor 410 on an example device 420 (e.g., a client device 120) detects a physical event, e.g., a user input. Data representative of the detected event is passed (represented by arrow 430) through a kernel-level driver 440, a hardware abstraction later 450, and an operating framework 460, to a software application 470 executing on the example device 420. As presented above, in reference to FIG. 3, the example device 420 may also transmit data representative of the event to an emulation server 170 via the network 110. Other device designs pass data from sensors and input mechanisms to software in other manner. The illustrated example flow of data is not meant to be limiting.

The sensor 410 can be any sensor capable of converting a physical event into electronic signals. Examples include various motion sensors (such as accelerometers (single- or multi-axis), tilt sensors, and gyroscopes), physical buttons (e.g., volume buttons), touch sensors, touch-screens, microphones, cameras, temperature sensors, humidity sensors, and so forth. Each such sensor converts physical input into an electronic signal that can then be processed by the logic circuitry (e.g., a processor) on the example device 420.

The example device 420 is a computing system, or processor-based device, that receives input and executes software applications. The example device 420 may be any device capable of functioning as described, and may be, for example, the client device 120 described above in reference to FIG. 1. In some implementations, the example device 420 includes one or more hardware elements for facilitating data input and data presentation, e.g., a keyboard, a display, a touch screen, a microphone, and/or a speaker. In some implementations, the example device 420 includes a sensor 410 capable of detecting physical events. In some implementations, the example device 420 is implemented using special purpose logic circuitry, e.g., an application specific integrated circuit (ASIC). In some implementations, the example device 420 is implemented using a general purpose processor. FIG. 7, described in more detail below, illustrates a computing device that, in some configurations, is suitable for use as an example device 420.

The example device 420 runs an operating system that includes one or more kernel-level drivers 440. Each kernel-level driver 440 converts input signals from a corresponding sensor 410 into a data representation that the operating system can handle. In some implementations, the kernel-level driver 440 is compiled into the operating system. In some implementations, the kernel-level driver 440 is dynamically loaded into the kernel, e.g., during a start-up or boot phase. In some implementations, the operating system uses an interrupt handler to process signals from the kernel-level driver 440.

The hardware abstraction layer (HAL) 450 is an abstraction layer that allows the same operating framework 460 to function on multiple types of hardware. The HAL 450 converts different data representations that may be generated by the kernel-level driver 440 into a uniform data representation. In some implementations, the HAL 450 includes an event handler. In some implementations, the HAL 450 includes an event monitor. In some implementations, the HAL 450 includes an event handler, where the event handler includes an event monitor.

The operating framework 460 is an application interface that runs on the HAL 450. In some implementations, the operating framework 460 is part of the operating system for the example device 420. In some implementations, the operating framework 460 is an additional layer running on top of the operating system, e.g., providing additional functionality. In some implementations, the operating framework 460 is responsible for managing software installations, user accounts, security, authentication, and so on. In some implementations, the operating framework 460 includes an event handler. In some implementations, the operating framework 460 includes an event monitor. In some implementations, the operating framework 460 includes an event handler, where the event handler includes an event monitor.

The software application 470 is a distinct software package that is executed on top of the operating system. In some implementations, the software application 470 runs on top of the operating framework 460. The software application 470 may be packaged with the operating system, or installed separately, e.g., as a third-party application. The software application 470 may be a game, a utility, a tool, or any other software that the example device 420 might execute.

When the sensor 410 experiences or detects a physical event, data representative of the event is passed to the kernel-level driver 440. An arrow 430 represents the flow of this data through the kernel-level driver 440, the HAL 450, and the operating framework 460 to the software application 470. In some implementations, the kernel-level driver 440 converts data received from the sensor 410 in one format or data representation into another data format. For example, the input may be voltage levels and the kernel-level driver 440 may convert the voltage levels to sensor-specific values. The HAL 450 may receive the sensor-specific values and convert them to a more generalized sensor-type value. The operating framework 460 facilitates exchange of these values to the software application 470. In some implementations, the operating framework 460 includes a monitoring module that detects the values representing an event detected by the sensor 410. In some such implementations, the monitoring module adds this data to a data set representative of device activity. In some implementations, the monitoring module passes data to remote servers via the network 110, e.g., to the emulation server 170.

In some implementations, the data set representative of device activity includes data elements for various input sources and activities. For example, the data set may include separate data fields for each of several sensors 410. In some implementations, different sensors 410 may be scored differently. For example, in some implementations, touches (or screen taps) may be scored in a range (e.g., 7 to 10) depending on touch frequency, movement may be scored in a range (e.g., 0 to 10) depending on regularity, light sensor input may be scored in a range (e.g., 0 to 2) with a highest score for intermittent or blocked light, indicating a user's hand moving over the screen, etc. In some implementations, screen taps may be counted in accordance with screen location tapped. That is, the data set may include distinct counts for different locations on the screen that have been tapped. In some implementations, the screen locations are based on a grid dividing the screen into a predefined set of locations. In some implementations, the screen locations are based on the distance from a screen location, e.g., distance from the screen's center. In some implementations, the screen locations are identified dynamically, based on clusters of screen tap locations.

Figure 5:
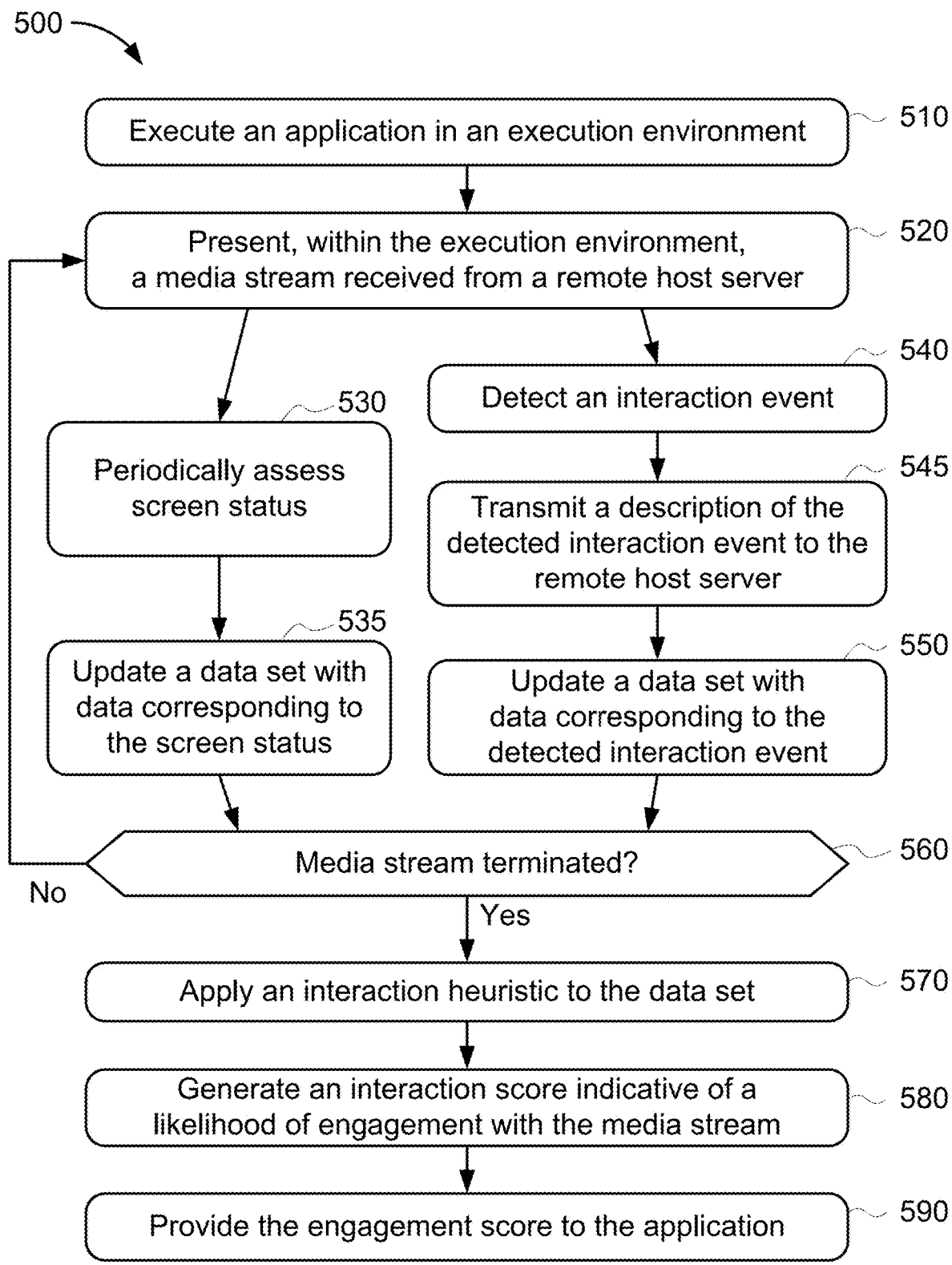
FIG. 5 is a flowchart for an example implementation of a method of determining whether a user engaged with third-party content.

FIG. 5 is a flowchart for an example implementation of a method 500 of determining whether a user engaged with third-party content. In broad overview of the method 500, at stage 510, a client device (e.g., the client device 120) executes an application in an execution environment. At stage 520, the client device presents, within the execution environment, a media stream received from a remote host server (e.g., the emulation server 170). At stage 530, the client device may periodically assess screen status. At stage 535, the client device may update a data set with data corresponding to the screen status. At stage 540, an event handler on the client device detects an interaction event and, at stage 545, transmits a description of the detected interaction event to the remote host server. At stage 550, an event monitor (which could also be the event handler) updates a data set with data corresponding to the detected interaction event. The event handler (and event monitor) continues presenting the media stream at stage 520, repeating stages 530, 535, 540, 545, and 550, until the media stream terminates. At stage 560, there is a determination whether the media stream has terminated (e.g., that the media stream is complete or that an allotted time has elapsed). If not, the flowchart returns to stage 540. Otherwise, at stage 570, an analyzer applies an interaction heuristic to the data set and, at stage 580, generates an engagement score indicative of a likelihood of engagement with the media stream. At stage 590, the analyzer provides the engagement score to the application.

Referring to FIG. 5 in more detail, at stage 510, a client device (e.g., the client device 120) executes an application in an execution environment. The execution environment may include, for example, the operating system and any dynamic load libraries provided by the operating system. In some implementations, the execution environment includes an event handler. In some implementations, the execution environment is a sandbox, isolating execution of different applications from each other. The application may be a software utility, a social media application, a game, or any other application that could be executed on a client device. For example, the application may be a game with a graphical user interface (GUI), e.g., a GUI similar to the GUI 210 shown in FIG. 2A.

When the client device executes the application locally, the execution environment can directly provide the application information about interaction events. For example, if a user pushes a button on the client device, that button push event can be relayed directly to the application. In some implementations, the application can communicate with resources available on the client device. For example, the application may be able to access any client device motion sensors (e.g., accelerometers or gyroscopes), any client device cameras, any client device environmental sensors, local or personal network devices (e.g., via a BLUETOOTH, NFC, or ANT+ radio), user permission settings, user restriction settings, and so forth. As described above, the application may occasionally present third-party content, including interactive content. However, the third-party content is not a separate discrete application installed on the client device and running locally. Instead, in some implementations, interactive content is provided within the application by presenting a media stream from a remote server and relaying, to the remote server, descriptions of interaction events.

A remote host server (e.g., the emulation server 170) executes a third-party application in an emulation or virtual machine environment. In some implementations, the emulation server 170 hosts a virtual machine version of the client device 120, or of a device with similar properties to the client device 120. For example, the client device 120 may have a specific screen size, run a specific operating system version, and have at least a minimum computing capability (e.g., minimum instruction set, cache size, processing speed, memory size, etc.). The emulation server 170, in such implementations, provides a virtual machine that has the same specific screen size, the same specific operating system version, and a computing capability matching the minimum computing capability. A virtual machine with this configuration may be used with any device that meets these parameters, allowing for one-to-many compatibility.

At stage 520, the client device presents, within the execution environment, a media stream received from the remote host server (e.g., the emulation server 170). In some implementations, the emulation server 170 has a virtual display device with a display buffer (e.g., a video graphics buffer) and the emulation server 170 streams the display buffer to the client device 120. In some implementations, the emulation server 170 has a virtual audio output device with an audio output buffer and the emulation server 170 streams the audio output buffer to the client device 120. In some implementations, the media stream includes both audio and graphics data. The stream is transmitted to the client device via the network 110 using either a standard protocol or a custom protocol. For example, the stream may be transmitted using a flow of packets transmitted using, for example, an OSI layer-4 transport protocol such as the User Datagram Protocol (UDP), the Transmission Control Protocol (TCP), or the Stream Control Transmission Protocol (SCTP). In some implementations, the stream is transmitted using a custom protocol, e.g., a custom application protocol layered over a standard transport protocol.

At stage 530, the client device periodically assess screen status. In some implementations, the client device captures an image of the screen (a "screen capture"). In some implementations, the client device identifies the state of a sub-set of the screen's pixels. This sub-set, or sampling, is representative of the screen status. In some implementations, the data corresponding to the state of a screen is a sampling of pixel states for a subset of display pixels. The sampling may be of specific pixels selected as a representative subset of the overall screen display. In some implementations, an event handler (or event monitor) on the client device periodically captures status information for the same set of pixels. Status information for a pixel may include, for example, a color value, hue, contrast, brightness, saturation, and so forth. The color value may be a red-green-blue (RGB) value, a cyan-magenta-yellow-key (CMYK) value, a Chroma-based "YCbCr" or "Y'CbCr" value, a PANTONE value, or a color value using any other color value scheme. The set of pixels may be a predetermined set of pixels. In some implementations, the set of pixels is initially selected at random, but the same set of pixels is used throughout presentation of the media stream. In some implementations, each iteration of stage 530 captures data for a random set of pixels.

At stage 535, the client device updates a data set with data corresponding to the screen status. In some implementations, the client device updates the data set with a copy of the screen capture. For example, the data set may include a time-series of the screen captures representative of the media stream. In some implementations, the client device updates the data set with data corresponding to changes in the screen display state. For example, if only a small subset of pixels examined have changed from a prior period, only data representative of the change might be added to the data set. Analysis of the data set may identify, from the data included, when and where the screen changed.

At stage 540, an event handler on the client device 120 detects an interaction event. While the client device is presenting the media stream received in stage 520, an event handler on the client device detects interaction events, e.g., user attempts to interact with the client device. In some implementations, the interaction event is a tactile input event such as a screen tap, a button depression, a button release, or a mouse click. In some implementations, the interaction event is a change in a configuration for the client device 120, e.g., an increase, decrease, or muting of the device audio volume settings. In some implementations, the interaction event is a screen lock event or cover close event. In some implementations, the interaction event is a device movement event detected by a motion sensor on the client device 120. For example, the client device 120 may include an accelerometer, a gyroscope, a tilt-sensor, or any other type of motion sensor. The event handler detects the input, e.g., the tactile input or device movement, and processes it as an interaction event. In some implementations, a separate event monitor hooks or intercepts the interaction event. In some implementations, the event handler includes the event monitor.

At stage 545, the client device 120 transmits a description of the detected interaction event to the remote host server, e.g., the emulation server 170. The transmitted description provides the remote host server with sufficient information for the remote host server to recreate the interaction event. In some implementations, the description of the detected interaction event is a duplicate representation of the interaction event. In some implementations, the description of the detected interaction event is a compressed representation of the interaction event. In some implementations, the remote host server (e.g., the emulation server 170) receives the transmitted description of the detected interaction event and recreates the event in the emulation environment or virtual machine. A remote application executed in the emulation environment or virtual machine can then react to the interaction event as though it were a local event.

At stage 550, an event monitor (which could also be the event handler) updates a data set with data corresponding to the detected interaction event. In some implementations, the data set is a data structure collecting discrete representations of interaction events. For example, in some implementations, the data set is an ordered list (e.g., a time-ordered list) of interaction event descriptions. In some implementations, the data set includes a number of taps in each of several screen regions. For example, the screen may be divided into twenty-five regions (a 5×5 grid having a center region, corner regions, mid-regions, and in-between regions) and tap counts may be accumulated for each region. Tap frequencies and variations between regions tapped may be included in the data set. In some implementations, the data set may include data representing time and duration data of device movement events. For example, the data set may include, for each device movement event, a corresponding start time and duration. In some implementations, the device movement data may also include more detailed information such as how substantial the movement was, direction (e.g., yaw, pitch, roll) of the movement, and whether the movement was unidirectional or a back-and-forth movement like a shake. In some implementations, the data set may include device orientation data indicating, for example, whether the device's primary screen is facing up, sideways, or down (e.g., perhaps face-down on a surface). In some implementations, the data set includes aggregate statistical data. For example, in some implementations, the data set includes a count of a number of times the screen was tapped during a preview presentation session. Aggregate statistics may include, for example, tap counts, tap frequency, tap locations, movement occurrence counts, and so forth. In some implementations, the data set is stored locally, on the client device 120. In some such implementations, the data set is stored in a buffer that is cleared periodically, e.g., after completion of a preview presentation session. In some implementations, the data set is stored in a ring buffer.

In some implementations, the event monitor periodically updates the data set with data corresponding to a state of a screen on the client device 120. Where the client device 120 has multiple screens, the event monitor may update the data set with data corresponding to each screen. In some implementations, the event monitor may update the data set with data corresponding to a primary screen, e.g., a "front" screen, a largest screen, or a screen with highest resolution. In some implementations, the data corresponding to the state of a screen is a screen capture, i.e., an image of whatever the client device 120 is displaying on the screen at the time. In some implementations, the data corresponding to the state of a screen is a sampling of pixel states for a subset of display pixels. The sampling may be of specific pixels selected as a representative subset of the overall screen display. In some implementations, the event monitor updates the data set with data corresponding to changes in the screen display state. For example, if only a small subset of pixels examined have changed from a prior period, only data representative of the change might be added to the data set. Analysis of the data set may identify, from the data included, when and where the screen changed. If the screen displays a splash screen waiting for user input, and does not change after displaying the splash screen until the preview presentation session terminates, this may suggest a lack of user engagement. Likewise, if there is a period of time during which the screen doesn't change followed by another period of time during which the screen does change, this may suggest that the user engaged with the content resulting in the screen change. Accordingly, at stage 550, some implementations include periodically updating the data set with data corresponding to a state of a screen on the client device 120.

For example, in some implementations, the event handler (or event monitor) periodically updates the data set by capturing a first sample of pixel states for a set of display pixels on the client device 120 at a first time during presentation of the received third-party media stream and capturing a second sample of pixel states for the set of display pixels on the client device 120 at a second time during presentation of the received third-party media stream. The event handler (or event monitor) then determines that at least a portion of the set of display pixels changed state between the first sample and the second sample and updates the data set with data corresponding to the portion of the set of display pixels changed.

The event handler (and event monitor) continues with stage 520, repeating stages 530, 535, 540, 545, and 550 until the media stream terminates. The event handler (and event monitor) continue to detect interaction events, transmit descriptions of the detected events to the media-stream source, and update a data set with data corresponding to the detected events until the media stream has completed (or a time allotted for a preview presentation session has elapsed).

At stage 560, there is a determination whether the media stream is complete or whether time allotted for a preview presentation session has elapsed. For example, the preview presentation session may be allotted ninety seconds in which to present the media stream. In some implementations, the application may present a user with an "escape option" to terminate the preview presentation session. For example, in FIG. 2C, the graphical user interface (GUI) 240 shown is an example splash screen for a playable demo game with a message bar 250 and an escape button 255 layered over the GUI 240. A user can click or tap on the escape button 255 to terminate the preview presentation session. In some implementations, the escape button 255 is presented after an initial period, e.g., after a fixed number of seconds or after a predetermined percentage of the time allotted for the preview presentation session. In some implementations, the escape button 255 is presented for the entire preview presentation session, but may not be actionable until after an initial period. When a user selects the escape button 255, while it is actionable, the preview presentation session is terminated. In some implementations, the remote server may determine to end a preview presentation session. For example, an application executed on the remote server, which acts as the source for the media stream, may terminate, ending the preview presentation session. While the preview presentation session remains active, the flowchart 500 returns from decision stage 560 to stage 540. Otherwise, when the media stream has completed or when a time allotted for the preview presentation session has elapsed, the flowchart continues to stage 570.

At stage 570, an analyzer applies an interaction heuristic to the data set. FIG. 6, described below, is a flowchart 600 for an example implementation of a heuristic for user engagement. In some implementations, a heuristic different from the one shown in FIG. 6 may be used, or a set of heuristics may be used. In some implementations, the analyzer is on the client device, e.g., as part of the event monitor. In some implementations, the client device transmits the data set to a remote server for analysis or the data set is accumulated on a remote server for analysis. For example, analysis on the client device may avoid any transmission delays. Conversely, performing the analysis on a server may allow for more computing power to be directed to the analyzer. The interaction heuristic converts the data set representative of interaction events occurring during the preview presentation session into a likelihood that a user of the client device 120 engaged with the media stream. In some implementations, the heuristic is applied without regard to the nature or format of the third-party content or the source of the media stream. For example, the same heuristic may be applied to presentation of different third-party content such as demonstrations of various games and utility applications, interactive video advertisements. In some implementations, a heuristic is selected from a set of heuristics. For example, a preview distribution server may select the third-party content to be presented from a set of possible content options. Each content option may be associated with a corresponding heuristic. Each heuristic can be tailored to a type of content, without being specific to a particular third-party content. That is, the association of content options to heuristics can be many-to-one. For example, a heuristic that favors frequent screen taps without regard to tap location may be associated with demonstration games while a different heuristic that favors infrequent screen taps along a horizontal line may be associated with surveys or "question-and-answer" content. Yet another heuristic might expect very few (or no) screen taps while scoring engagement primarily based on motion of the client device during the preview presentation session. Such a heuristic may be associated with a demonstration of an application for which device motion is the primary form on user input. Accordingly, third-party content can be assigned to a category for which a heuristic is available to score engagement likelihood.

In some implementations, the heuristic may be used to determine whether a user ignored the client device during the preview presentation session. For example, if the client device 120 is set down, with the front screen of the client device 120 facing down, or if the device audio playback is set to mute during the preview presentation session, these could be strong indicators that the user did not engage with the content. Likewise, small motions of the client device 120 may indicate that the user continued to hold the device during the preview presentation session, which may suggest a higher likelihood of engagement. In some implementations, a heuristic takes into account whether or not the screen changed display states during the preview presentation session. For example, if the screen displays a menu option awaiting user input, and does not change, this could indicate that the user did not engage with the content. In some implementations, a heuristic takes into account whether an escape button (e.g., the escape button 255) was used to terminate the preview presentation session early (however, early termination does not necessarily mean that the user didn't engage—the user might have finished engaging with the third-party content before an allotted period of time had elapsed). As another example, if the volume of the device audio playback is increased or un-muted, these events may indicate the user engaged with the third-party content during the preview presentation session. In some implementations, such heuristics are associated with third-party content that is less interactive (or not interactive at all). For example, the media stream could be a video advertisement such as a preview (or "trailer") for a movie, after which no user interaction is expected (or after which user interaction is limited to a "buy tickets now" button). These and other examples are described in more detail below. For example, an example heuristic is described in detail in reference to FIG. 6.

Referring still to FIG. 5, at stage 580, the analyzer generates an engagement score indicative of a likelihood of engagement with the media stream. In some implementations, the score is the output of the heuristic applied to the data set at stage 570. In some implementations, the score is based on the output of the heuristic applied to the data set at stage 570. In some implementations, the score is normalized to a range, e.g., between 0 and 1 or between 1 and 100. In some implementations, the score a Boolean value (e.g., True if the user is likely to have engaged with the content, and otherwise False). In some implementations, the score represents the engagement detected as compared to engagement that might have been expected based on observed characteristics of the media stream.

At stage 590, the analyzer provides the engagement score to the application. For example, the analyzer may provide a score such as a number on a range (e.g., between 0 and 1 or between 1 and 100). Different applications may use the likelihood of engagement score to provide rewards, as discussed earlier in this document. One application may provide a reward at a lower threshold than another application. The likelihood of engagement score relates, to the application, how likely it is that the user engaged with the third-party content presented during the preview presentation session. In some implementations, the score is generated and provided without knowledge of the actual content presented during the preview presentation session.

FIG. 6 is a flowchart 600 for an example implementation of a heuristic for user engagement. The heuristic described is just one example, as many alternative heuristics can also be used in various implementations. The heuristic described in reference to FIG. 6 may be implemented by an interaction analyzer on the client device or on a back-end server provided with a log of interaction event data. In brief overview of the flowchart 600, at stage 610, an interaction analyzer counts the total tactile input events detected during a session. Tactile input events may include, for example, screen taps, mouse clicks, button clicks, and movements of motion sensors on the client device. At stage 620, the interaction analyzer determines whether the total tactile input activity meets a gating threshold. If there are too few events, i.e., the activity is below the gating threshold, then the interaction analyzer returns a minimal engagement score at stage 625. Otherwise, at stage 630, the interaction analyzer segments the session, e.g., by length of time or by changes in screen variability. At stage 640, the interaction analyzer calculates an interaction score for each segment. At stage 642, the interaction analyzer counts the total number of discrete input events, e.g., clicks and taps, detected during the segment. At stage 644, the interaction analyzer adds, to this count, the total number of device movement events detected during the segment. At stage 648, the interaction analyzer divides the total count of input events by the length of the segment. This results in an aggregate event frequency for the segment. At stage 652, the interaction analyzer selects a control constant based on the segment's screen variability. At stage 654, the interaction analyzer multiplies the aggregate event frequency by the constant selected at stage 652 to calculate the interaction score for the segment. Then, at stage 660, the interaction analyzer returns an average of the interaction scores for the segments for the session.

Referring to FIG. 6 in more detail, at stage 610, the interaction analyzer counts the total tactile input events detected during a session. Tactile input events may include, for example, screen taps, mouse clicks, button clicks, and movements of motion sensors on the client device. In some implementations, tactile input events are classified as either movement events or as click (or tap) events. While click (or tap) events have clear boundaries, movement events represent motion of the client device in at least one direction, and may include changes in direction. In some implementations, a movement event is distinguished according to criteria such as a movement in one direction for at least a minimum length of time and/or a movement in one direction followed by a movement in a second direction, where the second direction is different from the first direction by at least a minimum angle. For example, the second direction may need to be essentially the opposite direction from the first direction (e.g., with an angle of at least 165 degrees from the axis of motion). In some implementations, other criteria for distinguishing a movement event are used. In some implementations, a shaking action (which may include several changes in direction in a brief window of time) is counted as a single motion event.

At stage 620, the interaction analyzer determines whether the total tactile input activity meets a gating threshold. In some implementations, the gating threshold is a fixed number of events that must be detected to qualify as engagement. In some implementations, the gating threshold is a function of the length (in time) of the session. For example, the gating threshold may be a minimum frequency of events. In some implementations, a motion gating threshold is compared to a number of device motion events and a separate click gating threshold is compared to a number of click (or tap) events.

If, at stage 620, the interaction analyzer determines that there are too few events, i.e., the activity is below the gating threshold, then the interaction analyzer returns a minimal engagement score at stage 625. The minimal engagement score may be, for example, zero or 0.01. In some implementations, the interaction analyzer returns a value equal to the number of events counted in stage 610 divided by a constant, e.g., a multiple of the gating threshold. This low value conveys both that the engagement detected was minimal and that at least some interactions were detected.

If, at stage 620, the interaction analyzer determines that there are enough events, i.e., the activity is at or above the gating threshold, then at stage 630, the interaction analyzer segments the session. In some implementations, the interaction analyzer segments the session by dividing the session into a fixed number of segments each of equal length (in time). For example, the interaction analyzer may divide the session into ten equal-length segments. In some implementations, the interaction analyzer segments the session by dividing the session into segments each of a predetermined fixed length of time, where the last segment may be shorter than the predetermined fixed length. For example, the interaction analyzer may divide the session into five-second segments, where the last segment may be shorter than five seconds. In some implementations, the interaction analyzer segments the session by identifying segment break points such as changes in interaction activity or changes in screen activity. That is, the interaction analyzer may identify moments in the session where an activity level changes from a first level to a second level, and divide the session into segments at the identified change point. In some implementations, the interaction analyzer segments the session by changes in screen variability. In some implementations, the interaction analyzer segments the session into an initial segment with a corresponding expected level of screen variability, one or more middle segments each with a corresponding expected level of screen variability, and a terminal segment with a corresponding expected level of screen variability. For example, the initial segment may be a loading or "splash" screen for which interaction is expected to be minimal, while the middle segments are expected to be more engaging, followed by a terminal segment that provides follow-up instructions and is less dynamic.

At stage 640, the interaction analyzer calculates an interaction score for each segment. Stages 642, 644, 648, 652, and 654 are repeated for each of the segments identified in stage 630. As described in more detail below, an average of these interaction scores is then returned at stage 660.

At stage 642, the interaction analyzer counts the total number of discrete input events, e.g., clicks and taps, detected during the segment. Discrete input events may include the tactile input events described above, for example, screen taps, mouse clicks, button clicks, and so forth. In some implementations, the discrete input events exclude movement events, i.e., events based on movements of motion sensors on the client device.

At stage 644, the interaction analyzer adds, to this count, the total number of device movement events detected during the segment. In some implementations, device movements events are limited to movements satisfying inclusion criteria such as including movement in a first direction for a minimum length of time followed by a change in direction to a second direction. In some implementations, the total number of device movement events corresponds to the movement events distinguished according to the criteria as described above. In some implementations, the total number of device movement events corresponds to the movement events distinguished according to the criteria different from that described above. For example, the criteria for inclusion in the count at stage 644 may be more (or less) restrictive than the criteria used in stage 610.

At stage 648, the interaction analyzer divides the total count of input events by the length of the segment, e.g., by the number of seconds (or micro-seconds) in the segment. This results in an aggregate event frequency for the segment.

At stage 652, the interaction analyzer selects a control constant based on the segment's screen variability. A relatively stable screen may expect fewer interactions than a comparatively more active and variable screen. The constant selected represents an expected event frequency for segments with the observed level of screen variability; for example, the constant may be an inverse of the expected event frequency for segments with comparable screen variability.

At stage 654, the interaction analyzer multiplies the aggregate event frequency by the constant selected at stage 652 to calculate the interaction score for the segment. In an implementation where the constant selected is an inverse of the expected event frequency, multiplying the observed event frequency by the constant yields a ratio of observed to expected. That is, a number less than 1 would represent less activity than expected, while a number greater than 1 would represent more activity than expected.

At stage 660, the interaction analyzer returns an average of the interaction scores for the segments for the session. In some implementations, the average is an arithmetic mean. In some implementations, the average is a trimmed mean that omits one or more outlier segments from the average. Although described above with clicks and taps and movement events added directly to result in a total count, in some implementations, clicks and taps and/or movement events may be weighted differently. For example, in one such implementation, clicks and taps may be counted as discussed above at stage 642, while movement events may be first multiplied by a weight, such as 0.5, and then added to the count. This may reflect implementations in which movement events may be less indicative of engagement, for example. Accordingly, in some implementations, the total count may be equal to $k_1$(# of clicks or taps)+$k_2$(# of movement events), with $k_1$ and $k_2$ being the same or different weighting coefficients. Other factors or indicators may be similarly multiplied by weighting coefficients.

In some implementations, heuristics other than the example illustrated in FIG. 6 are used. The heuristic may take into account one or more of: the number of button or screen taps, the locations or screen regions of the taps, the frequency of the taps, the occurrence of device movement, the duration of device movements, the position of the device resulting from device movements, and/or whether or not the screen itself changed after the taps or movements. For example, in some implementations, the heuristic assigns a high engagement score when there are screen taps during the middle of the preview presentation session and screen taps in varying locations or regions of the screen during at least a portion of the preview presentation session (e.g., during the second half of the preview presentation session after a presumed load or instruction screen). As another example, in some implementations, the heuristic assigns a low engagement score when there are no screen taps, or when the screen taps are only at the beginning of the preview presentation session. In some implementations, the heuristic applies a low score if the device audio playback is set to mute during the preview presentation session. In some implementations as discussed above, the heuristic applies various weights to different interaction events. For example, a screen tap may be weighted more heavily if it is followed some measurable amount of motion of the client device 120, and weighted less if it is followed by a noticeable absence of motion of the client device 120 (e.g., suggesting the device was set down on a surface and ignored). In one such implementation, a weight k for a click or tap may therefore vary over time t from a detected movement, such as $k=n/(1+t^2)$ with n equal to a predetermined maximum score (e.g. 1), or $k=1-(1-t)^4$, or any other such linear or non-linear function. For example, in one implementation, a weight may have a stepwise function (e.g. k=1 from t=0 to 2 seconds from a movement event; 0.5 from t=2 to 4 seconds, and 0 for t>4 seconds).

In some aspects, the disclosure relates to a method that includes: presenting, by a client device, within an execution environment of an application, a third-party media stream distinct from the application, the third-party media stream received by the client device from a remote host server via a network; detecting, by the client device during presentation of the third-party media stream, an interaction event; transmitting, to the remote host server via the network, a description of the detected interaction event; updating a data set with data corresponding to the detected interaction event; evaluating an interaction heuristic applied to the data set; and providing, to the application, an indicator of a likelihood of engagement with the third-party media stream based on the evaluation of the interaction heuristic.

In some aspects, the disclosure relates to a system that includes a client device. The client device has a processor and memory, the memory storing instructions that, when executed by the processor, cause the processor to: present, within an execution environment of an application, a third-party media stream distinct from the application, the third-party media stream received by the client device from a remote host server via a network; detect, during presentation of the third-party media stream, an interaction event; transmit, to the remote host server via the network, a description of the detected interaction event; update a data set with data corresponding to the detected interaction event; evaluate an interaction heuristic applied to the data set; and provide, to the application, an indicator of a likelihood of engagement with the third-party media stream based on the evaluation of the interaction heuristic.

In some aspects, the disclosure relates to a non-transitory computer-readable memory storing executable instructions that, when executed by a processor, cause the processor to: present, within an execution environment of an application, a third-party media stream distinct from the application, the third-party media stream received by a client device from a remote host server via a network; detect, during presentation of the third-party media stream, an interaction event; transmit, to the remote host server via the network, a description of the detected interaction event; update a data set with data corresponding to the detected interaction event; evaluate an interaction heuristic applied to the data set; and provide, to the application, an indicator of a likelihood of engagement with the third-party media stream based on the evaluation of the interaction heuristic.

In some implementations, the interaction heuristic is based on a number or frequency of interaction events detected during presentation of the received third-party media stream. Interaction events may include a tactile input event that is one of a screen tap, a button depression, a button release, or a mouse click. Interaction events may include a device movement event detected by a motion sensor on the client device such as an accelerometer, gyroscope, or tilt-sensor. In some implementations, the interaction heuristic is based on changes in pixels displayed on the client device during the preview presentation session.

FIG. 7 is a block diagram of an example computing system 101. The example computing system 101 is suitable for use in implementing the computerized components described herein, in accordance with an illustrative implementation. In broad overview, the computing system 101 includes at least one processor 107 for performing actions in accordance with instructions and one or more memory devices 106 or 109 for storing instructions and data. The illustrated example computing system 101 includes one or more processors 107 in communication, via a bus 105, with memory 106, at least one network interface controller 112 with network interface 111 for connection to a network device 114 (e.g., for access to a network), and other components 103, e.g., input/output (I/O) components 102. Generally, the processor(s) 107 will execute instructions received from memory. The processor(s) 107 illustrated incorporate, or are directly connected to, cache memory 109. In some instances, instructions are read from memory 106 into cache memory 109 and executed by the processor(s) 107 from cache memory 109.

In more detail, the processor(s) 107 may be any logic circuitry that processes instructions, e.g., instructions fetched from the memory 106 or cache 109. In many embodiments, the processor(s) 107 are microprocessor units or special purpose processors. The computing system 101 may be based on any processor, or set of processors, capable of operating as described herein. The processor(s) 107 may be single core or multi-core processor(s). The processor(s) 107 may be multiple distinct processors. In some implementations, the processor(s) 107 are implemented as circuitry on one or more "chips."

The memory 106 may be any device suitable for storing computer readable data. The memory 106 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or BLU-RAY discs). A computing system 101 may have any number of memory devices 106.

The cache memory 109 is generally a form of computer memory placed in close proximity to the processor(s) 107 for fast access times. In some implementations, the cache memory 109 is part of, or on the same chip as, the processor(s) 107. In some implementations, there are multiple levels of cache 109, e.g., L2 and L3 cache layers.

The network interface controller 112 manages data exchanges via the network interface 111 (sometimes referred to as a network interface port). The network interface controller 112 handles the physical and data link layers of the OSI model for network communication. In some implementations, some of the network interface controller's tasks are handled by one or more of the processor(s) 107. In some implementations, the network interface controller 112 is incorporated into the processor 107, e.g., as circuitry on the same chip. In some implementations, a computing system 101 has multiple network interfaces 111 controlled by a single controller 112. In some implementations, a computing system 101 has multiple network interface controllers 112. In some implementations, each network interface 111 is a connection point for a physical network link (e.g., a cat-5 Ethernet link). In some implementations, the network interface controller 112 supports wireless network connections and an interface 111 is a wireless (e.g., radio) receiver/transmitter (e.g., for any of the IEEE 802.11 protocols, near field communication "NFC", BLUETOOTH, BLE, ZIG-BEE, ANT, or any other wireless protocol). In some implementations, the network interface controller 112 implements one or more network protocols such as Ethernet. Generally, a computing system 101 exchanges data with other computing devices via physical or wireless links through a network interface 111. The network interface 111 may link directly to another device or to another device via an intermediary device, e.g., a network device such as a hub, a bridge, a switch, or a router, connecting the computing system 101 to a data network such as the Internet.

The computing system 101 may include, or provide interfaces for, one or more input or output (I/O) components 102. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 103 may include an I/O interface, external serial device ports, and any additional co-processors. For example, a computing system 101 may include an interface (e.g., a universal serial bus (USB) interface) for connecting input devices, output devices, or additional memory devices (e.g., portable flash drive or external media drive). In some implementations, a computing system 101 includes an additional device 103 such as a co-processor. For example, a math co-processor can assist the processor 107 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array (FPGA) or an application specific integrated circuit (ASIC). Such a special purpose circuit may be referred to as a computer processor even if it is not a general-purpose processor.

A user may opt in or out of allowing remote servers to identify and store information about the user and/or about devices operated by the user. For example, the user may opt in to receiving third-party content selected based on apparent relevance to the user. In some implementations, a device identifier is associated with a particular instance of a client application (e.g., running on client device 120). In some implementations, the user may be represented using a randomized device identifier (e.g., a cookie, a device serial number, etc.) that contains no personally-identifying information about the user. For example, information relating to the user's name, demographics, etc., may not be used by a remote server unless the user opts in to providing such information. Thus, the user has control over how information is collected about him or her and used by a remote server or other content source. Some information that may be associated with the user, or with an anonymized token representative of the user, may include events, such as one or more queries, one or more clicks, browser history data (e.g., the URLs visited, the number of URLs viewed, URL visit durations, etc.), etc.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method comprising:
presenting, by a client device, within an execution environment of an application, the execution environment being a sandboxed environment within the application, a third-party media stream, wherein the application cannot verify whether a user actually engages with the third-party media stream, wherein the third-party media stream comprises an interactive preview session of the third-party media stream received by the client device from a remote host server via a network;
detecting, by the client device during presentation of the third-party media stream, a plurality of interaction events with the client device;
transmitting, to the remote host server via the network, a description of the plurality of detected interaction events;

updating, by the client device, a data set with data corresponding to the plurality of detected interaction events;

generating, by applying an interaction heuristic to the data set, an interaction score indicative of a likelihood of engagement with the third-party media stream, wherein the likelihood of engagement is indicative of interaction with the third-party media stream during the interactive preview session;

providing the interaction score to the application, and performing, by the application, an action based upon the interaction score, wherein the action is determined based on the interaction score.

2. The method of claim 1, comprising detecting the interaction event by intercepting the interaction event.

3. The method of claim 1, wherein the interaction event is one of:
a device movement event detected by a motion sensor on the client device, or
a tactile input event that is one of a screen tap, a button depression, a button release, or a mouse click.

4. The method of claim 1, wherein the interaction heuristic is based on a number or frequency of tactile input events detected during presentation of the received third-party media stream.

5. The method of claim 1, wherein the interaction heuristic is based on a number or frequency of device movement events detected during presentation of the received third-party media stream.

6. The method of claim 1, comprising:
capturing a first sample of pixel states for a set of display pixels on the client device at a first time during presentation of the received third-party media stream;
capturing a second sample of pixel states for the set of display pixels on the client device at a second time during presentation of the received third-party media stream;
determining that at least a portion of the set of display pixels changed state between the first sample and the second sample; and
updating the data set with data corresponding to the portion of the set of display pixels changed.

7. The method of claim 6, wherein the set of display pixels is a set of pixels initially selected at random.

8. The method of claim 6, wherein the set of display pixels is a set of display pixels allocated to presentation of the third-party media stream.

9. The method of claim 6, further comprising selecting the interaction heuristic responsive to the portion of the set of display pixels changed.

10. The method of claim 1, comprising transmitting the data set to a remote computing device via a network, wherein the remote computing device applies the interaction heuristic.

11. The method of claim 1, wherein the indicator of engagement with the third-party media stream is one of a Boolean value or a value within a predefined range.

12. The method of claim 1, wherein the application being agnostic to the content of the third-party media stream comprises the application having no internal information regarding the content or interface of the third-party media stream.

13. The method of claim 1, wherein the application being agnostic to the content of the third-party media stream comprises the application having no internal information regarding the location of the interactive elements of the third-party media stream.

14. The method of claim 1, wherein the interaction score is generated without knowledge of content presented in the third-party media stream.

15. A system comprising a client device comprising a processor and memory, the memory storing instructions that, when executed by the processor, cause the processor to:
present, within an execution environment of an application, the execution environment being a sandboxed environment within the application, a third-party media stream, wherein the application cannot verify whether a user actually engages with the third-party media stream, wherein the third-party media stream comprises an interactive preview session of the third-party media stream received by the client device from a remote host server via a network;
detect, during presentation of the third-party media stream, a plurality of interaction events with the client device;
transmit, to the remote host server via the network, a description of the plurality of detected interaction events;
update a data set with data corresponding to the plurality of detected interaction events;
generate, by applying an interaction heuristic to the data set, an interaction score indicative of a likelihood of engagement with the third-party media stream, wherein the likelihood of engagement is indicative of interaction with the third-party media stream during the interactive preview session;
provide the interaction score to the application; and
perform an action based upon the interaction score, wherein the action is determined based on the interaction score.

16. The system of claim 15, the client device further comprising a motion sensor, wherein the interaction event is one of:
a device movement event detected by the motion sensor.

17. The system of claim 15, wherein the interaction event is a tactile input event that is one of a screen tap, a button depression, a button release, or a mouse click.

18. The system of claim 15, wherein the interaction heuristic is based on a number or frequency of interaction events detected during presentation of the received third-party media stream.

19. The system of claim 15, the client device further comprising a screen divided into pixels, the memory further storing instructions that, when executed by the processor, cause the processor to:
capture a first sample of pixel states for a set of display pixels on the client device at a first time during presentation of the received third-party media stream;
capture a second sample of pixel states for the set of display pixels on the client device at a second time during presentation of the received third-party media stream;
determine that at least a portion of the set of display pixels changed state between the first sample and the second sample; and
update the data set with data corresponding to the portion of the set of display pixels changed.

20. The system of claim 19, wherein the set of display pixels is a set of display pixels allocated to presentation of the third-party media stream.

21. The system of claim 19, the memory further storing instructions that, when executed by the processor, cause the processor to select the interaction heuristic responsive to the portion of the set of display pixels changed.

22. A non-transitory computer-readable medium storing instructions that, when executed by a processor, cause the processor to:
present, within an execution environment of an application, the execution environment being a sandboxed environment within the application, a third-party media stream, wherein the application cannot verify whether a user actually engages with the third-party media stream, wherein the third-party media stream comprises an interactive preview session of the third-party media stream received by a client device from a remote host server via a network;
detect, during presentation of the third-party media stream, a plurality of interaction events with the client device;
transmit, to the remote host server via the network, a description of the plurality of detected interaction events;
update a data set with data corresponding to the plurality of detected interaction events;
generate, by applying an interaction heuristic to the data set, an interaction score indicative of a likelihood of engagement with the third-party media stream, wherein the likelihood of engagement is indicative of interaction with the third-party media stream during the interactive preview session;
provide the interaction score to the application; and
perform an action based upon the interaction score, wherein the action is determined based on the interaction score.

23. The non-transitory computer-readable medium of claim 22, wherein the interaction heuristic is based on a number or frequency of interaction events detected during presentation of the received third-party media stream.

\* \* \* \* \*